United States Patent
Faulkner

(10) Patent No.: US 10,506,195 B2
(45) Date of Patent: Dec. 10, 2019

(54) CONCURRENT VIEWING OF LIVE CONTENT AND RECORDED CONTENT

(71) Applicant: MICROSOFT TECHNOLOGY LICENSING, LLC, Redmond, WA (US)

(72) Inventor: Jason Thomas Faulkner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/046,122

(22) Filed: Jul. 26, 2018

(65) Prior Publication Data

US 2019/0028667 A1 Jan. 24, 2019

Related U.S. Application Data

(63) Continuation of application No. 15/442,422, filed on Feb. 24, 2017, now Pat. No. 10,070,093.

(51) Int. Cl.
*H04N 5/445* (2011.01)
*H04L 29/06* (2006.01)
(Continued)

(52) U.S. Cl.
CPC ....... *H04N 5/44591* (2013.01); *G11B 27/002* (2013.01); *H04L 12/1831* (2013.01);
(Continued)

(58) Field of Classification Search
USPC ...................................................... 348/14.03
See application file for complete search history.

(56) References Cited

U.S. PATENT DOCUMENTS 8,667,401 B1 3/2014 Lozben
9,661,272 B1 5/2017 Daniel
(Continued)

OTHER PUBLICATIONS

"Notice of Allowance Issued in U.S. Appl. No. 15/426,992", dated Aug. 1, 2018, 09 Pages.
(Continued)

*Primary Examiner* — Amal S Zenati
(74) *Attorney, Agent, or Firm* — Newport IP, LLC; Jacob P. Rohwer

(57) ABSTRACT

Described herein are techniques to display live content of a teleconference session and recorded content of a teleconference session concurrently, in the same user interface. The recorded content and the live content can be part of the same teleconference session. Consequently, if a user joins the teleconference session late, the use can catch-up on missed activity of the teleconference session by viewing the recorded content while also staying engaged with the live content of the teleconference session as the teleconference session progresses. Alternatively, the recorded content and the live content can be part of different teleconference sessions. For instance, while viewing the live content of a live teleconference session, a user can view recorded content of a completed teleconference session. Consequently, the user is enabled to multi-task by viewing recorded content of a completed teleconference session that she or he missed (e.g., previous team meetings pertinent to the current meeting).

20 Claims, 14 Drawing Sheets

(51) Int. Cl.
*H04L 12/18* (2006.01)
*H04N 7/15* (2006.01)
*G11B 27/00* (2006.01)
G06F 3/0484 (2013.01)
G06F 3/0483 (2013.01)

(52) U.S. Cl.
CPC ...... *H04L 12/1895* (2013.01); *H04L 65/4023* (2013.01); *H04N 7/15* (2013.01); *H04N 7/155* (2013.01); *G06F 3/0483* (2013.01); *G06F 3/04847* (2013.01)

(56) References Cited

U.S. PATENT DOCUMENTS

| | | | |
|---|---|---|---|
| 2002/0194595 A1 | 12/2002 | Miller et al. | |
| 2003/0220973 A1 | 11/2003 | Zhu et al. | |
| 2004/0190700 A1* | 9/2004 | Cutaia | H04M 3/42221 379/202.01 |
| 2005/0256735 A1 | 11/2005 | Bayne | |
| 2009/0327425 A1* | 12/2009 | Gudipaty | H04N 7/147 709/205 |
| 2010/0299616 A1 | 11/2010 | Chen et al. | |
| 2011/0072037 A1 | 3/2011 | Lotzer | |
| 2012/0086680 A1* | 4/2012 | Ueda | G09G 5/14 345/204 |
| 2012/0117130 A1 | 5/2012 | Gearhart et al. | |
| 2012/0117659 A1 | 5/2012 | Gearhart et al. | |
| 2012/0124485 A1 | 5/2012 | Scherpa et al. | |
| 2012/0296914 A1* | 11/2012 | Romanov | G11B 27/034 707/741 |
| 2013/0205326 A1 | 8/2013 | Sinha et al. | |
| 2014/0198173 A1* | 7/2014 | Willig | H04N 7/15 348/14.03 |
| 2014/0214961 A1 | 7/2014 | Douglas | |
| 2015/0195411 A1* | 7/2015 | Krack | H04M 3/569 379/202.01 |
| 2015/0237082 A1 | 8/2015 | Duong et al. | |
| 2015/0237084 A1 | 8/2015 | Duong et al. | |
| 2016/0182851 A1* | 6/2016 | Girgensohn | H04N 5/765 386/230 |
| 2018/0227138 A1 | 8/2018 | Faulkner et al. | |
| 2018/0227339 A1 | 8/2018 | Rodriguez et al. | |
| 2019/0123925 A1 | 4/2019 | Faulkner et al. | |

OTHER PUBLICATIONS

"Notice of Allowance Issued in U.S. Appl. No. 15/427,007", dated Aug. 29, 2018, 08 Pages.

* cited by examiner

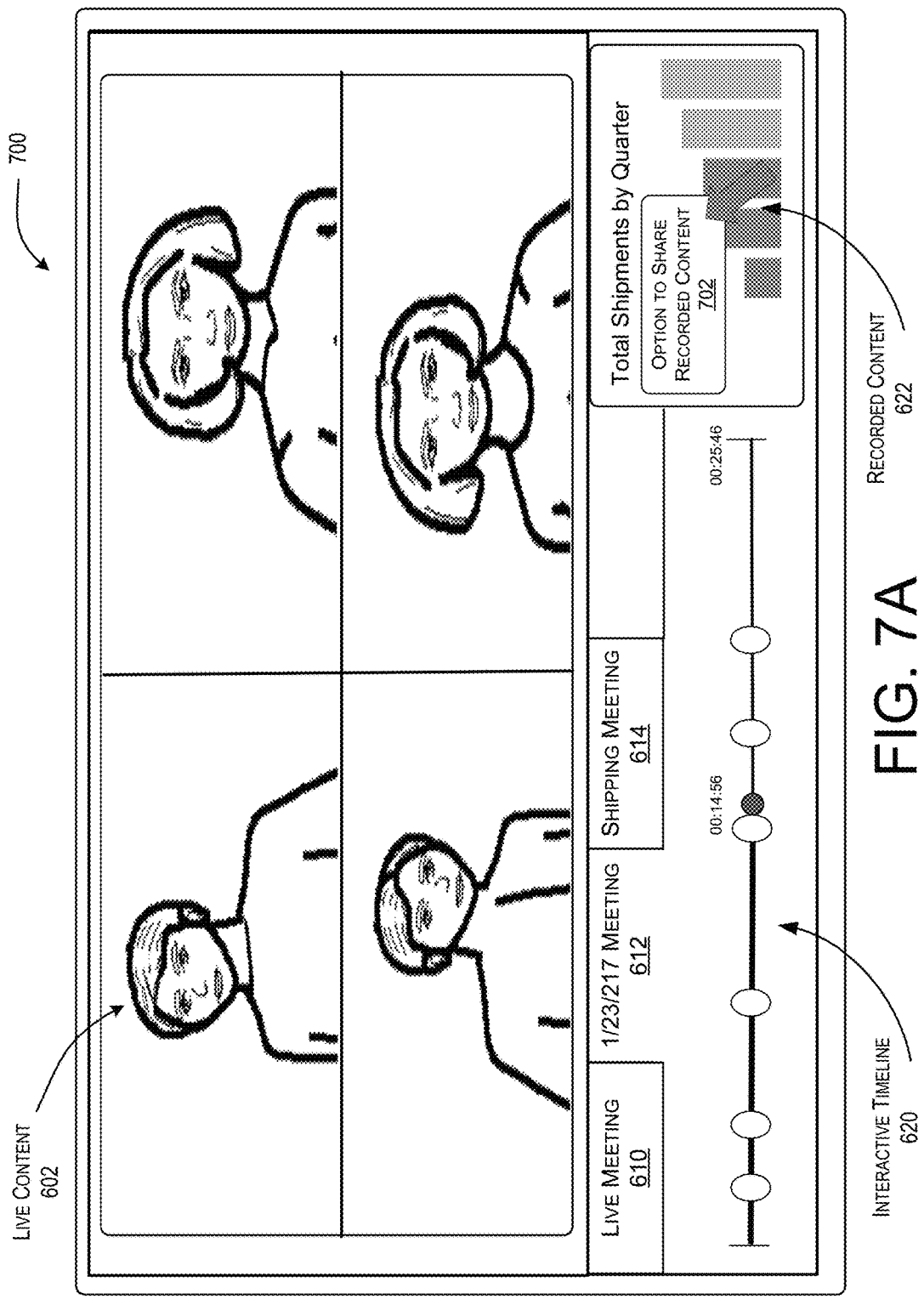

CONCURRENT VIEWING OF LIVE CONTENT AND RECORDED CONTENT

CROSS REFERENCE TO RELATED APPLICATIONS

This application is a continuation of and claims priority to U.S. application Ser. No. 15/442,422, entitled "Concurrent Viewing of Live Content and Recorded Content", filed Feb. 24, 2017, which is incorporated herein in their entirety.

BACKGROUND

At present, the use of teleconference (e.g., videoconference) systems in personal and commercial settings has increased dramatically so that meetings between people in remote locations can be facilitated. In general, teleconference systems allow users, in two or more remote locations, to communicate interactively with each other via live, simultaneous two-way video streams, audio streams, or both. Some teleconference systems (e.g., CISCO WEBEX provided by CISCO SYSTEMS, Inc. of San Jose, Calif., GOTOMEETING provided by CITRIX SYSTEMS, INC. of Santa Clara, Calif., ZOOM provided by ZOOM VIDEO COMMUNICATIONS of San Jose, Calif., GOOGLE HANGOUTS by ALPHABET INC. of Mountain View, Calif., and SKYPE FOR BUSINESS provided by the MICROSOFT CORPORATION, of Redmond, Wash.) also allow users to exchange files and/or share display screens that present, for example, images, text, video, applications, online locations, social media, and any others.

Teleconference systems enable a user to participate in a teleconference session (e.g., a meeting) via a remote device. In some scenarios, the user may join a teleconference session late due to a scheduling conflict, for example (e.g., a late lunch, another scheduled meeting at the same time, etc.). In these types of scenarios, if the user wants to know what previously occurred in the teleconference session, the user typically needs to navigate (e.g., fast forward and/or rewind) a recording of the teleconference session to try to find the relevant activity that was missed. While the user is viewing the recording of the teleconference session, the user is unable to view live content of the teleconference session as the teleconference session progresses.

SUMMARY

The disclosed techniques address the problems described above with regards to a teleconference session. Specifically, the disclosed techniques are configured to display live content and recorded content concurrently, in the same user interface generated and displayed by a teleconference system (e.g., a teleconference application). In some of the examples described herein, the recorded content and the live content that are concurrently displayed can be part of the same teleconference session (e.g., the same meeting). Consequently, if a user joins the teleconference session late, the use can catch-up on missed activity of the teleconference session by viewing the recorded content while also staying engaged with, and paying attention to, the live content of the teleconference session as the teleconference session progresses. A teleconference session that is currently in progress and for which live content is being displayed may be referred to herein as a live teleconference session.

In other examples described herein, the recorded content and the live content that are concurrently displayed can be part of different teleconference sessions (e.g., different meetings). For instance, while viewing the live content of a live teleconference session as the live teleconference session progresses, a user can access and view the recorded content of a completed teleconference session that previously occurred (e.g., a meeting that happened yesterday or the previous week). Consequently, the techniques described herein provide the user with a tool to multi-task. In one example, the user is enabled to find and view recorded content of a completed teleconference session that she or he missed (e.g., previous team meetings that may discuss subject matter pertinent to the current meeting). In another example, the user is enabled to find and view recorded content of a completed teleconference session that she or he would like to share with other participants of the live teleconference session (e.g., a slide of a presentation that occurred in a previous meeting).

In various examples, a user interface generated and displayed by a teleconference system and/or a teleconference application to concurrently display live content and recorded content can comprise a live stage and a recorded stage. A "stage" can comprise a display region of the user interface, and the display region can comprise one or more of a display area for the content of a teleconference session, a display area for a timeline useable to locate recorded content of interest to the user, and/or options (e.g., user interface elements configured for selection) that enable the user to interact with the content of the teleconference session and/or the timeline. Consequently, the live content can be displayed in a display area of the live stage and the recorded content can be displayed in a display area of the recorded stage. Typically, the display area of the live stage is larger than the display area of the recorded stage so the user is more aware of activity that occurs in the live content. However, the user interface can be configured to switch (e.g., toggle between, swap, etc.) the display of the live content in the larger display area and the display of the recorded content in the smaller display area so the user is more aware of activity that occurs in the recorded content. For instance, the switch can occur based on user input (e.g., a selection of an option to implement the switch) and/or the switch can be for a temporary period of time.

As mentioned above, the techniques described herein are configured to generate and display a timeline associated with a teleconference session. The timeline includes representations (e.g., markers, symbols, icons, nodes, thumbnails, etc.) of notable events that are associated with a teleconference session (e.g., a live teleconference session or a completed teleconference session). The timeline can represent an actual or a scheduled duration of the teleconference session, and thus, each representation of a notable event on the timeline can be associated with a timestamp, or a time period, based on when the notable event occurs within the teleconference session. Furthermore, the timeline is interactive (e.g., referred to herein as an "interactive timeline") such that a user is able to interact with individual representations on the timeline. In various examples, a notable event includes activity (e.g., one or more actions) in a teleconference session that is considered to be important or relevant to the teleconference session, such that knowledge of the activity via a quick view of a representation on the interactive timeline and/or via interacting with the representation to view additional information about the notable event enables a user to efficiently gain an awareness of what has occurred in the teleconference session. The notable events can be of a variety of different types, and thus, the interactive timeline can be configured to present different types of representations that correspond to different types of notable events.

Example types of notable events can include: a specific mention of a user (e.g., an "@mention"), a file or a display screen that is shared (e.g., a document, a presentation, a spreadsheet, a video, a web page, etc.), an explicit flag added to the interactive timeline by a user to mark an important moment, a time period of concentrated activity, or any other activity determined to provide value or contribute to understanding a context of the teleconference session.

Accordingly, the techniques described herein are configured to concurrently display live content of a teleconference session and recorded content of a teleconference session. Moreover, the techniques described herein are configured to display an interactive timeline. The interactive timeline can be associated with the live content or the recorded content. In some examples, two interactive timelines can be concurrently displayed, one associated with the live content and one associated with the recorded content. In other examples, the user interface is configured to display tabs to enable the user to switch between the display of multiple interactive timelines, so the user can view notable events associated with various teleconference sessions.

In various examples, the techniques described herein can cause a status indicator to be displayed to participants in a live teleconference session. The status indicator can indicate that the audio for the live content displayed has been disabled for a user so that the user can hear the audio for the recorded content displayed. Stated another way, when the user enables audio for the recorded content then the audio for the live content is disabled and a status indicator reflects the partial engagement where the user can see the live content but cannot hear the live content.

In various examples, the recorded stage can be used as a staging region to locate and prepare recorded content to be shared with others in the live teleconference session. Thus, a user can share previously recorded content via a live data stream to the live teleconferenced session (e.g., as live content). The user interface is configured to display an option that enables the user to share the recorded content and to configure the live data stream.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), device(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 7A illustrates an example graphical user interface configured to display an option for a user to share recorded content with other participants in the live teleconference session.

DETAILED DESCRIPTION

Examples described herein enable a system and/or device to display live content of a teleconference session and recorded content of a teleconference session concurrently, in the same user interface. The recorded content and the live content that are concurrently displayed can be part of the same teleconference session. Consequently, if a user joins the teleconference session late, the use can catch-up on missed activity of the teleconference session by viewing the recorded content while also staying engaged with the live content of the teleconference session as the teleconference session progresses. Alternatively, the recorded content and the live content that are concurrently displayed can be part of different teleconference sessions. For instance, while viewing the live content of a live teleconference session as the live teleconference session progresses, a user can access and view the recorded content of a completed teleconference session that previously occurred. Consequently, the techniques described herein provide the user with a tool to multi-task. In one example, the user is enabled to find and view recorded content of a completed teleconference session that she or he missed (e.g., previous team meetings that may discuss subject matter pertinent to the current meeting).

Various examples, implementations, scenarios, and aspects are described below with reference to FIGS. 1 through 10.

Figure 1:
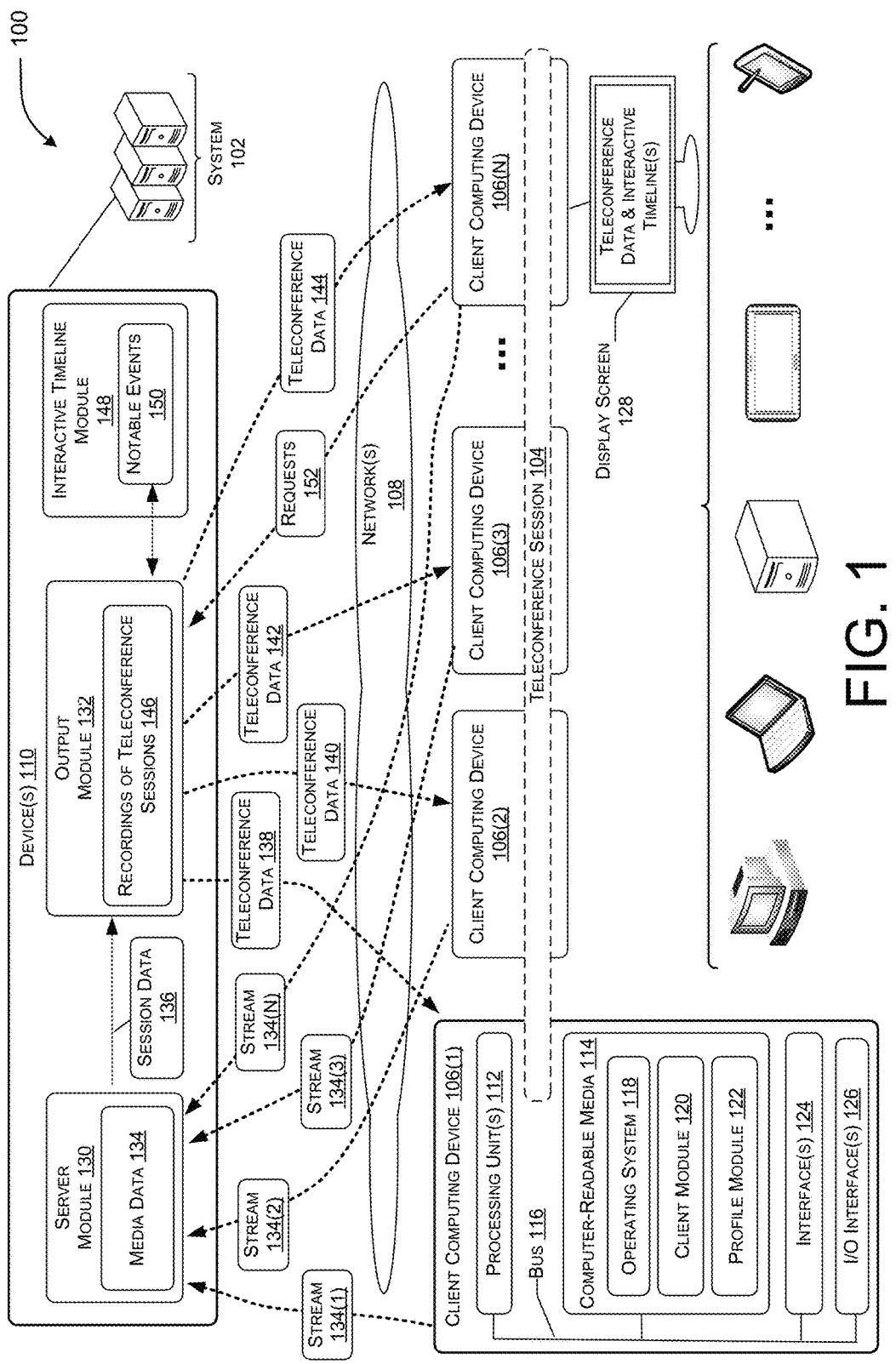
FIG. 1 is a diagram illustrating an example environment in which a system and/or device can concurrently display live content of a teleconference session and recorded content of a teleconference session.

FIG. 1 is a diagram illustrating an example environment 100 in which a system 102 can operate to cause content of a teleconference session 104 to be displayed on a client computing device. In this example, the teleconference session 104 is a live teleconference session that is being implemented between a number of client computing devices 106(1) through 106(N) (where N is a positive integer number having a value of two or greater). The client computing devices 106(1) through 106(N) enable users to participate in the teleconference session 104. In this example, the teleconference session 104 is hosted, over one or more network(s) 108, by the system 102. That is, the system 102 can provide a service that enables users of the client computing devices 106(1) through 106(N) to participate in the teleconference session 104. Consequently, a "participant" to the teleconference session 104 can comprise a user and/or a client computing device (e.g., multiple users may be in a conference room participating in a teleconference session via the use of a single client computing device), each of which can communicate with other participants. As an alternative, the teleconference session 104 can be hosted by one of the client computing devices 106(1) through 106(N) utilizing peer-to-peer technologies.

In examples described herein, client computing devices 106(1) through 106(N) participating in the teleconference session 104 are configured to receive and render for display, on a user interface of a display screen, teleconference data. The teleconference data can comprise a collection of various instances, or streams, of live content. For example, an individual stream of live content can comprise media data associated with a video feed (e.g., audio and visual data that capture the appearance and speech of a user participating in the teleconference session). Another example of an individual stream of live content can comprise media data that includes an avatar of a user participating in the teleconference session along with audio data that captures the speech of the user. Yet another example of an individual stream of live content can comprise media data that includes a file displayed on a display screen along with audio data that captures the speech of a user. Accordingly, the various streams of live content within the teleconference data enable a remote meeting to be facilitated between a group of people and the sharing of content within the group of people.

In examples described herein, the teleconference data can also comprise recorded content. The recorded content can be requested for viewing by a client computing device. The recorded content can be previous content from a live teleconference session (e.g., teleconference session 104) that is currently progressing, or the recorded content can come from a completed teleconference session that previously occurred. In some instances, the recorded content can be configured as an individual stream to be shared as live content in a live teleconference session.

The system 102 includes device(s) 110. The device(s) 110 and/or other components of the system 102 can include distributed computing resources that communicate with one another and/or with the client computing devices 106(1) through 106(N) via the one or more network(s) 108. In some examples, the system 102 may be an independent system that is tasked with managing aspects of one or more teleconference sessions such as teleconference session 104. As an example, the system 102 may be managed by entities such as SLACK, WEBEX, GOTOMEETING, GOOGLE HANGOUTS, etc.

Network(s) 108 may include, for example, public networks such as the Internet, private networks such as an institutional and/or personal intranet, or some combination of private and public networks. Network(s) 108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 108 may utilize communications protocols, including packet-based and/or datagram-based protocols such as Internet protocol ("IP"), transmission control protocol ("TCP"), user datagram protocol ("UDP"), or other types of protocols. Moreover, network(s) 108 may also include a number of devices that facilitate network communications and/or form a hardware basis for the networks, such as switches, routers, gateways, access points, firewalls, base stations, repeaters, backbone devices, and the like.

In some examples, network(s) 108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, and so forth), and other standards.

In various examples, device(s) 110 may include one or more computing devices that operate in a cluster or other grouped configuration to share resources, balance load, increase performance, provide fail-over support or redundancy, or for other purposes. For instance, device(s) 110 may belong to a variety of classes of devices such as traditional server-type devices, desktop computer-type devices, and/or mobile-type devices. Thus, although illustrated as a single type of device—a server-type device—device(s) 110 may include a diverse variety of device types and are not limited to a particular type of device. Device(s) 110 may represent, but are not limited to, server computers, desktop computers, web-server computers, personal computers, mobile computers, laptop computers, tablet computers, or any other sort of computing device.

A client computing device (e.g., one of client computing device(s) 106(1) through 106(N)) may belong to a variety of classes of devices, which may be the same as, or different from, device(s) 110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality (AR) device, an implanted computing device, an automotive computer, a network-enabled television, a thin client, a terminal, an Internet of Things ("IoT") device, a work station, a media player, a personal video recorders ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 106(1) through 106(N) of the various classes and device types can represent any type of computing device having one or more processing unit(s) 112 operably connected to computer-readable media 114 such as via a bus 116, which in some instances can include one or more of a system bus, a data bus, an address bus, a PCI bus, a Mini-PCI bus, and any variety of local, peripheral, and/or independent buses.

Executable instructions stored on computer-readable media 114 may include, for example, an operating system 118, a client module 120, a profile module 122, and other modules, programs, or applications that are loadable and executable by processing units(s) 112.

Client computing device(s) 106(1) through 106(N) may also include one or more interface(s) 124 to enable communications between client computing device(s) 106(1) through 106(N) and other networked devices, such as device(s) 110, over network(s) 108. Such network interface(s) 124 may include one or more network interface controllers (NICs) or other types of transceiver devices to send and receive communications and/or data over a network. Moreover, client computing device(s) 106(1) through 106(N) can include input/output ("I/O") interfaces 126 that enable communications with input/output devices such as user input devices including peripheral input devices (e.g., a game controller, a keyboard, a mouse, a pen, a voice input device such as a microphone, a touch input device, a gestural input device, and the like) and/or output devices including peripheral output devices (e.g., a display, a printer, audio speakers, a haptic output device, and the like). FIG. 1 illustrates that client computing device 106(N) is in some way connected to a display device (e.g., a display screen 128), which can display the teleconference data and the interactive timeline(s) for one or more teleconference sessions.

In the example environment 100 of FIG. 1, client computing devices 106(1) through 106(N) may use their respective client modules 120 to connect with one another and/or other external device(s) in order to participate in the teleconference session 104. For instance, a first user may utilize a client computing device 106(1) to communicate with a second user of another client computing device 106(2). When executing client modules 120, the users may share data, which may cause the client computing device 106(1) to connect to the system 102 and/or the other client computing devices 106(2) through 106(N) over the network(s) 108.

The client computing device(s) 106(1) through 106(N) may use their respective profile module 122 to generate participant profiles, and provide the participant profiles to other client computing devices and/or to the device(s) 110 of the system 102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for teleconference sessions.

As shown in FIG. 1, the device(s) 110 of the system 102 includes a server module 130 and an output module 132. The server module 130 is configured to receive, from individual client computing devices such as client computing devices 106(1) through 106(N), media streams 134(1) through 134(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 130 is configured to receive a collection of various media streams 134(1) through 134(N) (the collection being referred to herein as media data 134). In some scenarios, not all the client computing devices that participate in the teleconference session 104 provide a media stream. For example, a client computing device may only be a consuming, or a "listening", device such that it only receives content associated with the teleconference session 104 but does not provide any content to the teleconference session 104.

The server module 130 is configured to generate session data 136 based on the media data 134. In various examples, the server module 130 can select aspects of the media data 134 that are to be shared with the participating client computing devices 106(1) through 106(N). Consequently, the server module 130 is configured to pass the session data 136 to the output module 132 and the output module 132 may communicate teleconference data to the client computing devices 106(1) through 106(N). As shown, the output module 132 transmits teleconference data 138 to client computing device 106(1), transmits teleconference data 140 to client computing device 106(2), transmits teleconference data 142 to client computing device 106(3), and transmits teleconference data 144 to client computing device 106(N). The teleconference data transmitted to the client computing devices can be the same or can be different (e.g., positioning of streams of content within a user interface may vary from one device to the next). The output module 132 is also configured to record teleconference sessions (e.g., a version of the teleconference data) and to maintain recordings of teleconference sessions 146.

The device(s) 110 can also include an interactive timeline module 148, and in various examples, the interactive timeline module 148 is configured to determine notable events 150 in the session data 136 of a teleconference session and/or notable events added to a recording of the teleconference session 146. For instance, a notable event 150 can occur as a live viewing of a teleconference session is progressing such that activity that amounts to notable events by users of client computing devices 106(1) through 106(N) that are participating via the live viewing can be determined and added to an interactive timeline by the interactive timeline module 148. A notable event 150 can also occur in association with a recorded viewing of the recording of the teleconference session 146.

Examples types of notable events 150 can include: a specific mention of a user (e.g., an "@mention"), a specific mention of a team, a file or a display screen that is shared (e.g., a document, a presentation, a spreadsheet, a video, a web page, etc.), a comment that is submitted to a chat conversation that is associated with (e.g., is part of) the teleconference session, a task that is assigned, a poll that is conducted, an expression (e.g., an emoji) that is shared, a link to an external object such as another teleconference session (e.g., a link to a newly scheduled meeting while a current meeting is being conducted), a user joining the teleconference session, a user leaving the teleconference session, an explicit flag added to the interactive timeline by a user to mark an important moment, a time period of concentrated activity, the addition of supplemental recorded content to the teleconference session 104 and/or to the interactive timeline, or any other activity determined to provide value or contribute to understanding a context of the teleconference session.

A client computing device such as client computing device 106(N) can provide request(s) 152 to view a recording of a teleconference session (e.g., recorded content of the live teleconference session 104 or recorded content of a previously completed teleconference session) and/or to perform other actions associated with the live content and/or recorded content concurrently being displayed. In response, the output module 132 can provide the recorded content as teleconference data 144 to be concurrently displayed with live content on a display screen 128 associated with the client computing device 106(N).

Figure 2:
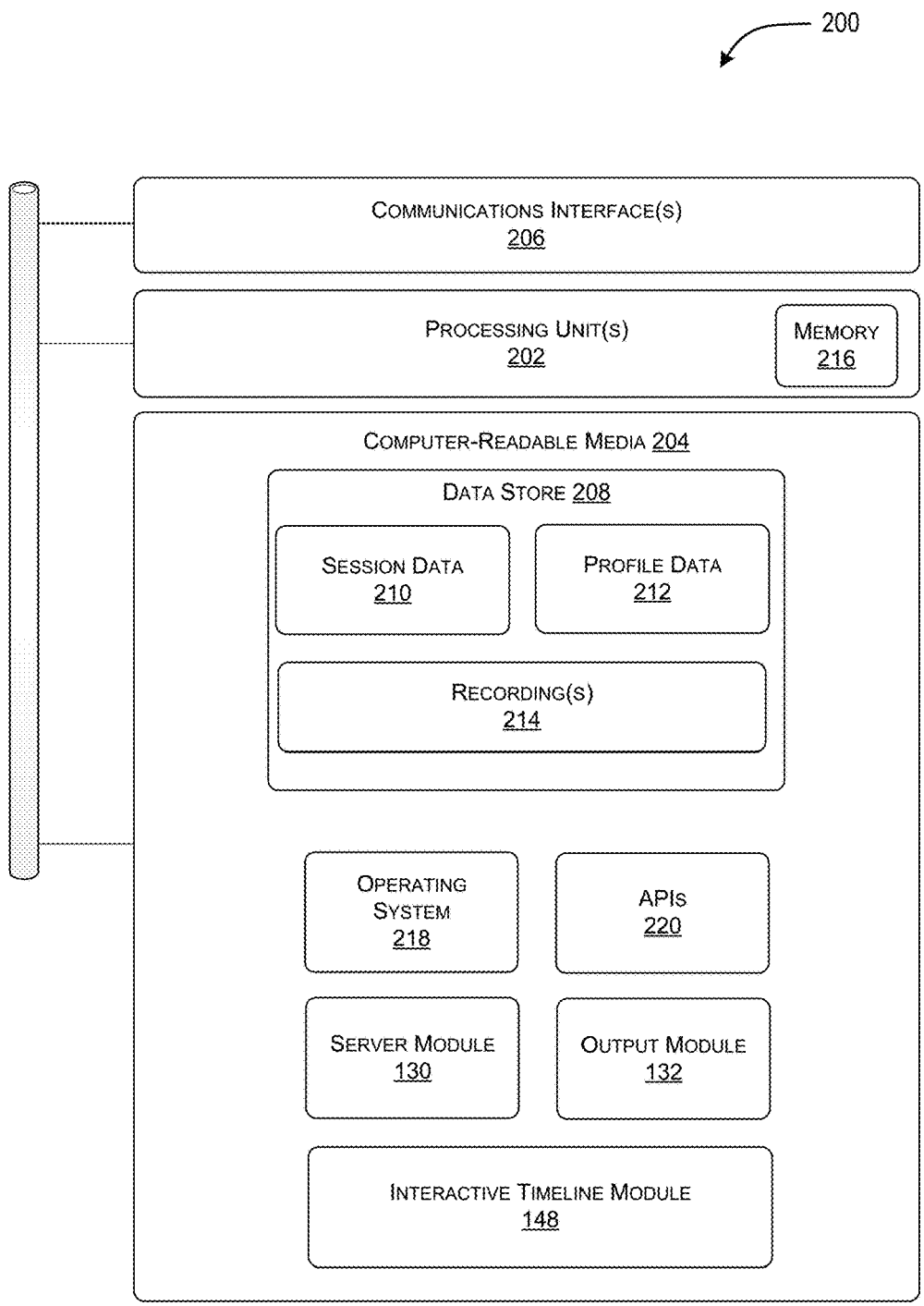
FIG. 2 is a diagram illustrating example components of an example device configured to cause concurrent display of live content of a teleconference session and of recorded content of a teleconference session.

FIG. 2 illustrates a diagram that shows example components of an example device 200 configured to cause concurrent display of live content of a teleconference session and of recorded content of a teleconference session. The device 200 may represent one of device(s) 110, or in other examples a client computing device, where the device 200 includes one or more processing unit(s) 202, computer-readable media 204, and communication interface(s) 206. The components of the device 200 are operatively connected, for example, via a bus, which may include one or more of a system bus, a data bus, an address bus, a PCI bus, a Mini-PCI bus, and any variety of local, peripheral, and/or independent buses.

As utilized herein, processing unit(s), such as the processing unit(s) 202 and/or processing unit(s) 112, may represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 204 and/or computer-readable media 114, may store instructions executable by the processing unit(s). The computer-readable media may also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media may include computer storage media and/or communication media. Computer storage media may include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 206 may represent, for example, network interface controllers ("NICs") or other types of transceiver devices to send and receive communications over a network.

In the illustrated example, computer-readable media 204 includes a data store 208. In some examples, data store 208 includes data storage such as a database, data warehouse, or other type of structured or unstructured data storage. In some examples, data store 208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 208 may store data for the operations of processes, applications, components, and/or modules stored in computer-readable media 204 and/or executed by processing unit(s) 202 and/or accelerator(s). For instance, in some examples, data store 208 may store session data 210 (e.g., session data 136), profile data 212 (e.g., associated with a participant profile), and/or other data. The session data 210 can include a total number of participants (e.g., users and/or client computing devices) in a teleconference session, activity that occurs in the teleconference session, and/or other data related to when and how the teleconference session is conducted or hosted. The data store 208 can also include recording(s) 214 of teleconference session(s), as well as interactive timeline(s) that include representations of notable event(s) that occur in association with the teleconference session(s).

Alternately, some or all of the above-referenced data can be stored on separate memories 216 on board one or more processing unit(s) 202 such as a memory on board a CPU-type processor, a GPU-type processor, an FPGA-type accelerator, a DSP-type accelerator, and/or another accelerator. In this example, the computer-readable media 204 also includes operating system 218 and application programming interface(s) 220 configured to expose the functionality and the data of the device 200 to other devices. Additionally, the computer-readable media 204 can include one or more modules such as the server module 130, the output module 132, and the interactive timeline module 148, although the number of illustrated modules is just an example, and the number may vary higher or lower. That is, functionality described herein in association with the illustrated modules may be performed by a fewer number of modules or a larger number of modules on one device or spread across multiple devices.

Figure 3A:
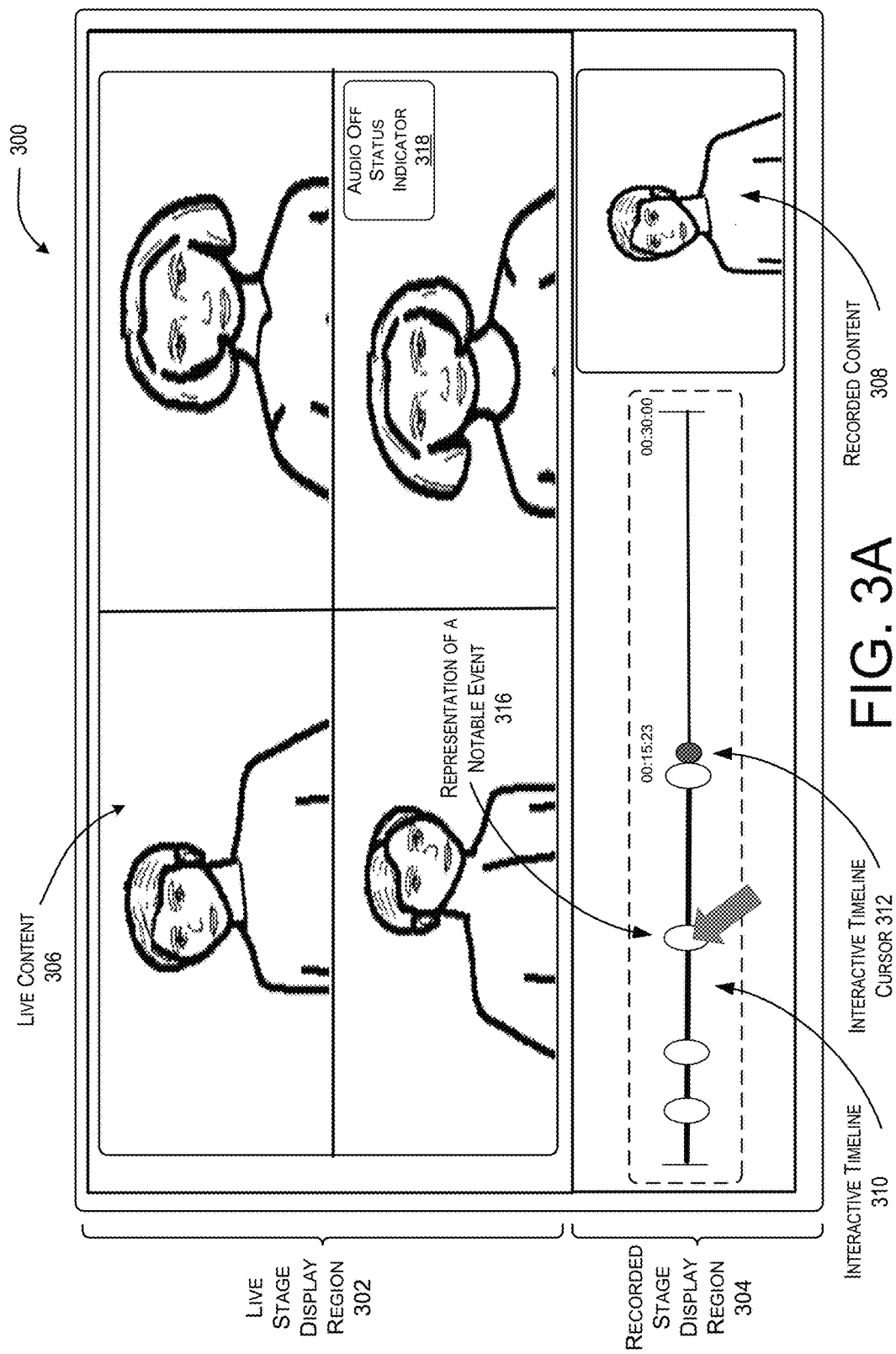
FIG. 3A illustrates an example graphical user interface configured to display an interactive timeline that enables a user to view recorded content of a teleconference session concurrently with live content of the teleconference session.

FIG. 3A illustrates an example graphical user interface 300 configured to display an interactive timeline that enables a user to view recorded content of a teleconference session concurrently with live content of the teleconference session. The graphical user interface 300 can comprise a single window that is generated and displayed by server components and/or client components of a teleconference system. Thus, the example graphical user interfaces described herein enable a user to concurrently engage (e.g., view) with both live content and recorded content at the same time and in the same teleconference experience.

As shown in this example, the graphical user interface 300 comprises a live stage display region 302 and a recorded stage display region 304. The live stage display region 302 comprises a portion of the user interface that includes a first display area to display the live content 306. The recorded stage display region 304 comprises a portion of the user interface that includes a display area to display the recorded content 308. Moreover, the recorded stage display region 304 comprises a portion of the user interface that includes an interactive timeline 310.

As described above, the interactive timeline module 148 is configured to determine when notable events 150 occur in association with a teleconference session and to generate the interactive timeline 310 to include representations of the notable events 150 (e.g., populate the interactive timeline with representations). That is, the interactive timeline module 148 can analyze session data to detect when a notable event occurs (e.g., a user says a name, a user shares a file, etc.). The interactive timeline 310 includes different representations (e.g., the circles, squares, or other shapes on the interactive timeline 310) that correspond to different types of notable events 150. In various implementations, a representation can comprise and/or be associated with: an icon or a symbol indicative of a type of notable event, a user avatar, and/or initials of a user. The interactive timeline 310 enables a user to interact with representations while viewing the live content 306. Since the interactive timeline 310 is associated with a live teleconference session in this example, the interactive timeline 310 only includes representations on the left of an interactive timeline cursor 312. The interactive timeline 310 can be populated with representations as the notable events occur. An interactive timeline cursor 312 represents a position, or a point, in a teleconference session that is currently being displayed. As shown, a user is currently viewing live content at a "00:15:23" mark of a meeting that has a scheduled duration of "00:30:00". The current view at this point in time comprises content in which four people (e.g., four separate audio/visual streams) are displayed in quadrants (e.g., four grid cells). A "view" comprises a configuration and/or a layout of content of the teleconference session.

FIG. 3A further illustrates that a user control element (e.g., a mouse cursor) is navigated to interact with a particular representation of a notable event 316 (e.g., click on the notable event). As described above, the notable event occurred previously in the teleconference session, and therefore, the notable event can be associated with recorded content. Consequently, via the interaction with the representation of the notable event 316, the user can view recorded content at a point or period of time in the teleconference session at which the notable event occurs. The interactive timeline 310 therefore allows the user to initially preview notable events that previously occurred in the teleconference session and to locate recorded content of interest that the user would like to view. Subsequently, the user can request that recorded content that starts at a particular position on the interactive timeline 310 (e.g., the position of the representation of the notable event 316) be played back. The play back of the recorded content 308 in the display area can be performed as the live content 306 continues to be displayed as the teleconference session progresses (e.g., the live content is not paused). As shown, the view of the recorded content 308 in its respective display area comprises an edge-to-edge view in which a single person is displayed. Consequently, a user is enabled to catch-up on missed activity of the teleconference session while the user stays engaged with the live content (e.g., in an event the user is late to join the teleconference session).

In various examples described herein, the user can provide input that enables and/or disables different audio outputs. That is, a first audio output may be associated with the live content and a second audio output may be associated with the recorded content. Accordingly, the graphical user interface 300 can be configured to visually signal, to the user, which content (e.g., live content 306 or recorded content 308) has audio enabled. In various examples, a default is set so that the first audio output is enabled and the second audio output is disabled. However, when the user locates recorded content of interest that he or she would like to hear, the user can switch the setting (e.g., the default setting) so that the second audio output is enabled and the first audio output is disabled. Based on this switch, a status indicator 318 can be generated, communicated, and/or displayed to the user and to other participants in a live teleconference session. The status indicator 318 can be graphically associated with the user and indicates that the audio for the live content has been disabled for a particular client computing device (e.g., so that the user(s) can hear the audio for the recorded content). Consequently, the status indicator 318 serves as a notification that the client computing device and/or the user are in a state of partial engagement where the user can see the live content but cannot hear the live content. If another participant wants the user to hear what is being said in the live content, he or she can use motion and/or submit a comment to gain the user's attention and/or instruct the user to subsequently enable the audio for the live content.

In some examples, the status indicator 310 can comprise switching the display of the user from live video that captures the visual appearance of the user to an avatar (e.g., image) of the user. In this way, the other participants are aware that the user is no longer fully engaged because they no longer see the live video feed but rather the user avatar. Furthermore, the interactive timeline 310 can be populated with a representation indicating a point in time when the user disables and/or enables the audio output for the live teleconference session.

In some instances, the audio output can automatically switch between the live content and/or the recorded content. For instance, the output module 132 can detect that one of the live content or the recorded content currently does not have any audio (e.g., the session comprises a portion where only text chat-collaboration is used to discuss file content displayed). Accordingly, the audio output can automatically be switched to the other of the live content or the recorded content that currently has audio.

In various examples, the interactive timeline 310 can comprise or be associated with a sequence of still images (e.g., thumbnail images) that captures activity of a view of the teleconference session at various positions or points in time. For instance, a thumbnail image associated with a video frame can be displayed in association with a representation (e.g., below the representation, above the representation, etc.). In some examples, the thumbnail image can be persistently displayed. Alternatively, the thumbnail image can be configured to come into view based on user interaction (e.g., hover input) with the interactive timeline 310 and/or a representation. Consequently, the interactive timeline 310 can provide the user with a visual preview of the recorded content. The user can scan the interactive timeline, the representations, and/or the sequence of images to locate recorded content that may be of interest.

Figure 3B:
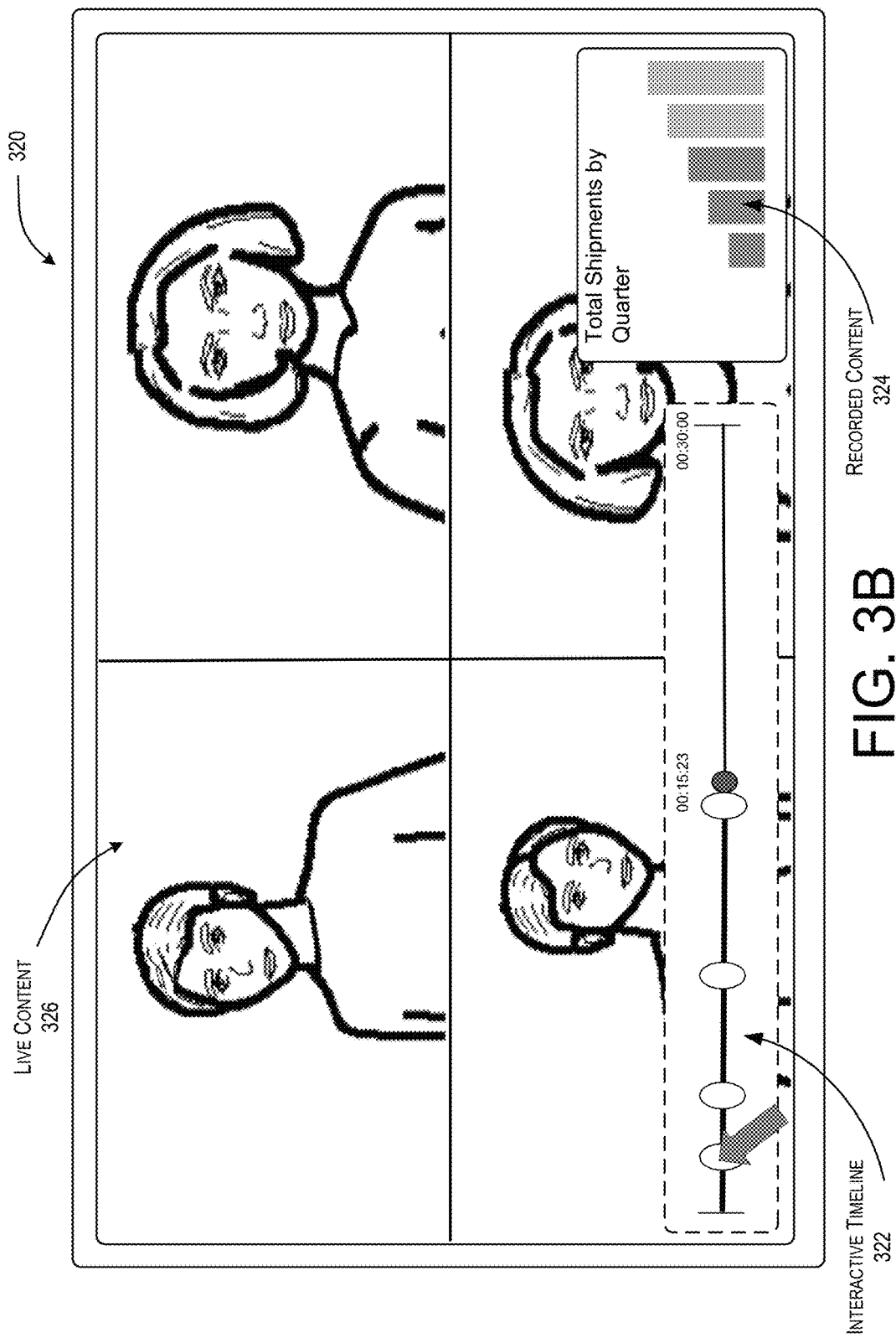
FIG. 3B illustrates another example graphical user interface configured to display an interactive timeline that enables a user to view recorded content of a teleconference session concurrently with live content of the teleconference session.

FIG. 3B illustrates another example graphical user interface 320 configured to display an interactive timeline that enables a user to view recorded content of a teleconference session concurrently with live content of the teleconference session. In the example of FIG. 3B, an interactive timeline 322 is displayed at the bottom of the user interface 320 that is presented on a display screen (e.g., display screen 128), and a display area that includes the interactive timeline 322 is not transparent. However, in alternative examples, the display area that includes the interactive timeline 322 can be a display area that is transparent. As shown in this example, the interactive timeline 322 and the display area that includes the recorded content 324 can be overlay display areas configured on top of the display area that includes the live content 326. Consequently, the graphical user interface 320 does not clearly distinguish between a live stage display region and a recorded stage display region in this example. Moreover, as shown, the view of the recorded content 324 comprises an edge-to-edge view of file content (e.g., a slide that summarizes "Total Shipments by Quarter") based on interaction of a user control element with a different representation.

Figure 4:
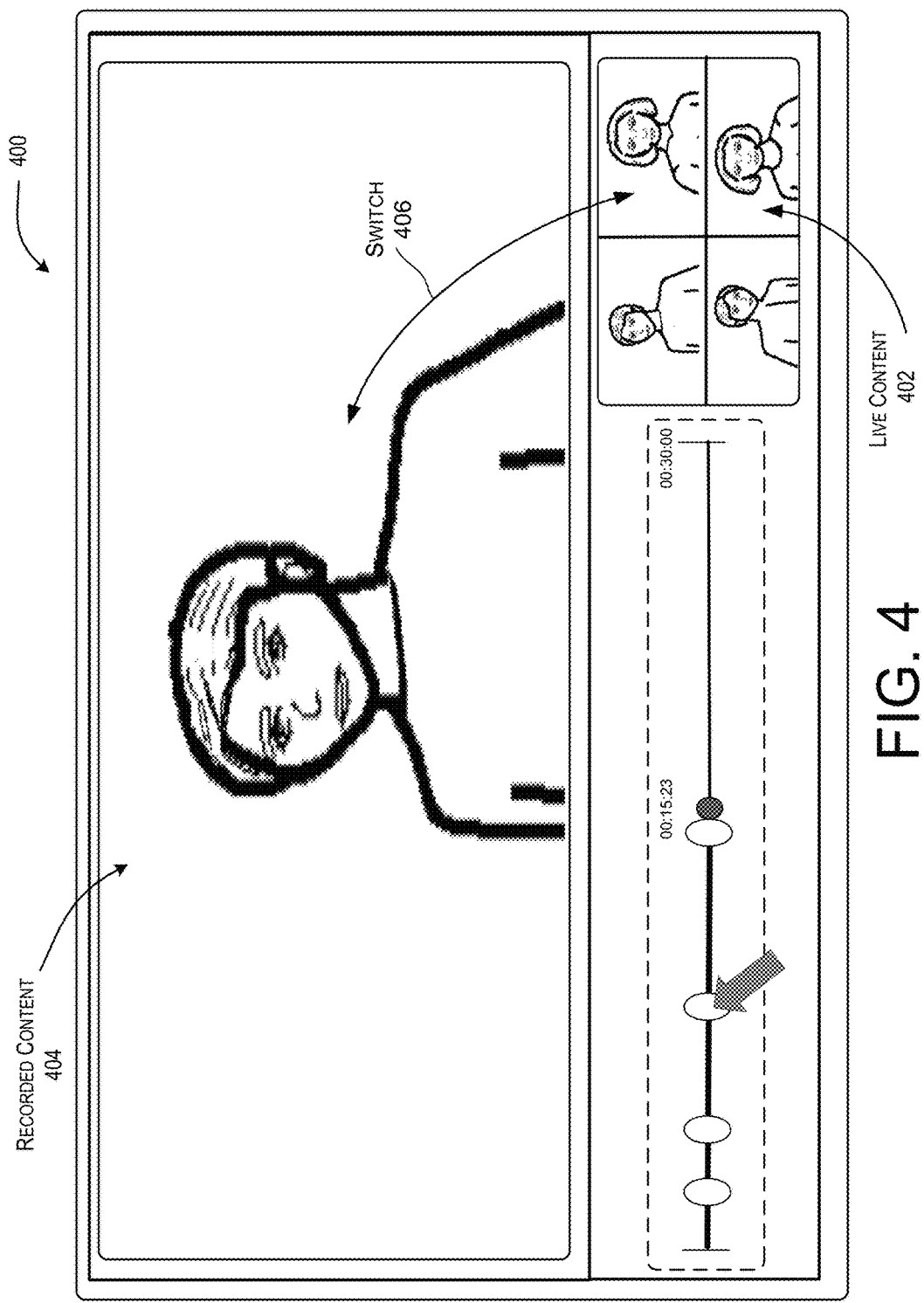
FIG. 4 illustrates an example graphical user interface configured to switch the display of the live content in a first display area of the user interface and the display of the recorded content in a second display area of the user interface.

FIG. 4 illustrates an example graphical user interface 400 configured to switch the display of the live content in a first display area and the display of the recorded content in a second display area. The live content 402 and the recorded content 404 displayed in the graphical user interface 400 corresponds to that displayed in the graphical user interface 300 of FIG. 3A. However, the live content 402 and the recorded content 404 have been switched 406 between the display areas (e.g., the non-overlapping display areas). In some examples, the switch 406 can be implemented based on user input (e.g., selection of a switch button or a click on the recorded content). For instance, the user can navigate and scrub the interactive timeline and corresponding recorded content can be displayed in the smaller display area as the user interacts with the interactive timeline (e.g., in the lower right corner of the user interface as shown in FIG. 3A). Upon finding recorded content of particular importance, the user can provide an input to have the recorded content 404 toggled to the larger display area which the live content previously occupied. Moreover, the live content 402 is toggled to the smaller display area which the recorded content previously occupied. In one example, the user input that switches the live and recorded content between the displays areas is associated with enabling the audio output for the recorded content 404. That is, the live content and the recorded content are switched between display areas when the user enables the audio for the recorded content and disables the audio for the live content (e.g., the larger display area is reserved for the content which is being audibly output).

Figure 5:
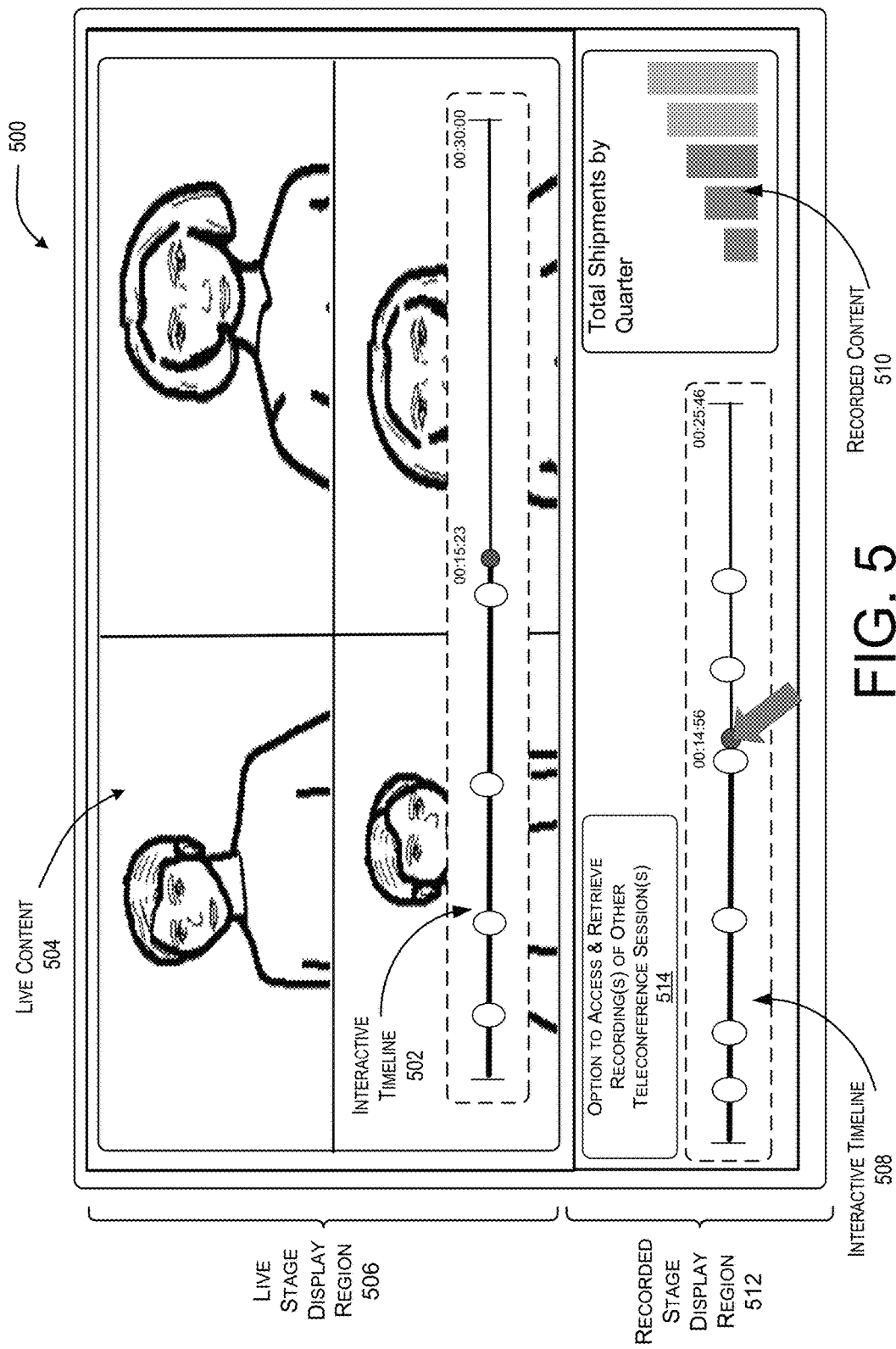
FIG. 5 illustrates an example graphical user interface configured to display an interactive timeline and live content of a live teleconference session concurrently with an interactive timeline and recorded content of a completed teleconference session.

FIG. 5 illustrates an example graphical user interface 500 configured to display an interactive timeline 502 and live content 504 of a live teleconference session in a live stage display region 506 concurrently with an interactive timeline 508 and recorded content 510 of a completed teleconference session in a recorded stage display region 512. That is, the graphical user interface is configured to concurrently display multiple interactive timelines. In this example, a user has joined the live teleconference session, and while viewing the live content 504 of the live teleconference session, the user can select an option (e.g., functionality) to access and retrieve recording(s) of other teleconference sessions 514. The option can be configured in the recorded stage display region 512, and the option can enable the user to enter text to search for a specific meeting and/or scroll through a list of previously completed meetings (e.g., for a particular team or group). Based on selection of a specific meeting, a request 152 can be sent to the system 102 and the recording(s) 146 can be retrieved. Consequently, the recorded stage display region 512 can be a portion of the graphical user interface 500 that is private to the user, so the user can access recordings of completed teleconference sessions and search for recorded content that may be of interest to the user. The live stage display region includes live content that is being shared with various users across a number of client computing devices 106(1) . . . 106(N) participating in the live teleconference session.

Accordingly, a user viewing the graphical user interface 500 of FIG. 5 is enabled to interact with multiple different interactive timelines. Similar to that shown in FIG. 3A, interactive timeline 502 shows that the interactive timeline cursor is located at the "00:15:23" mark of a meeting that is scheduled to last thirty minutes, and the live content 504 includes four people (e.g., four separate video streams) being displayed in four quadrants. Interactive timeline 508 shows that the interactive timeline cursor is located at the "00:14:56" mark of a completed meeting that actually lasted twenty-five minutes and forty-six seconds, and the recorded content 510 includes file content (e.g., a slide that summarizes "Total Shipments by Quarter").

Figure 6A:
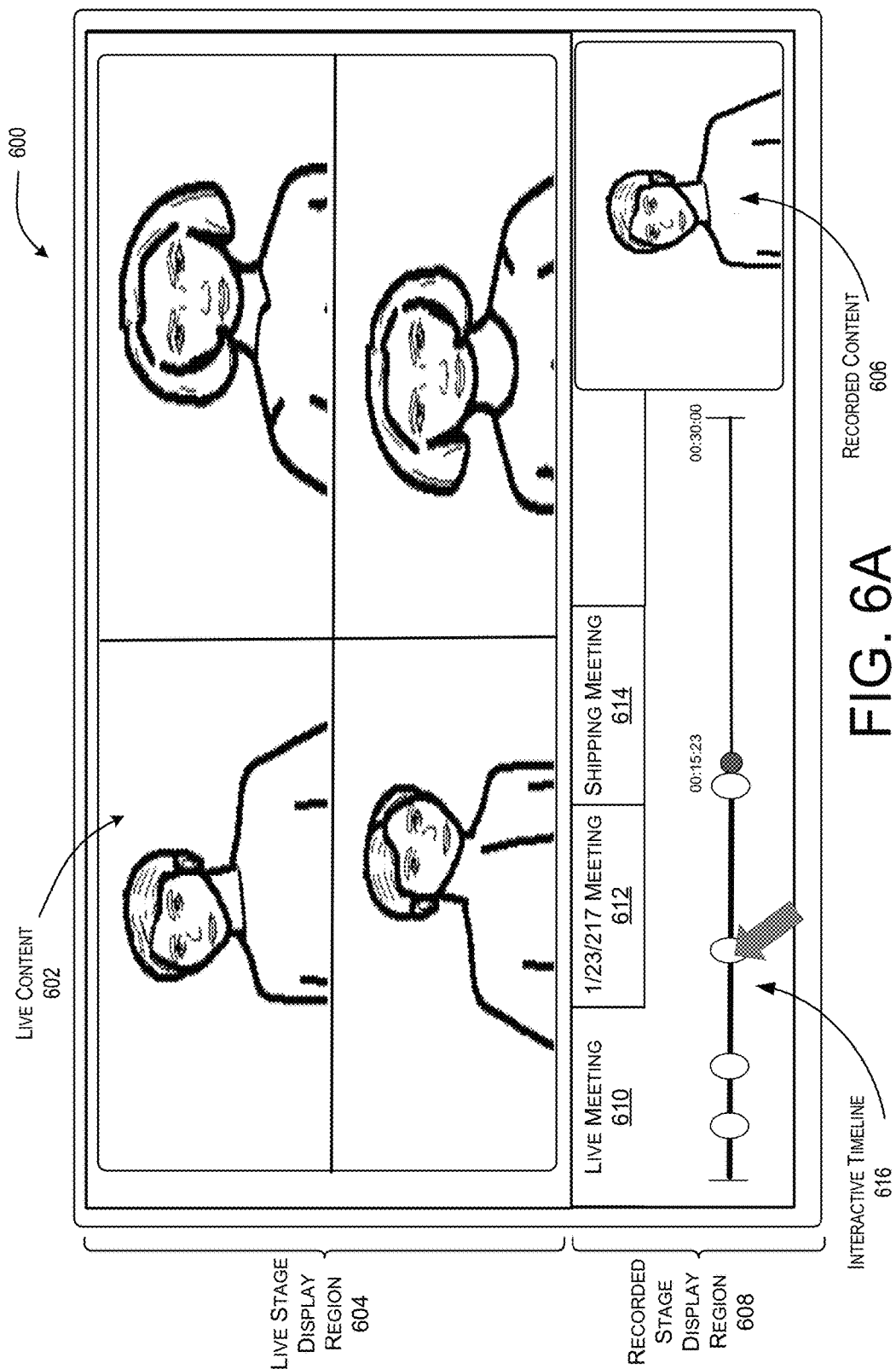
FIG. 6A illustrates an example graphical user interface configured to display (i) live content of a live teleconference session concurrently with recorded content of a completed teleconference session and (ii) tabs that enable a user to switch between interactive timelines associated with the live teleconference session and the completed teleconference session.

FIG. 6A illustrates an example graphical user interface 600 configured to display (i) live content 602 of a live teleconference session in a live stage display region 604 concurrently with recorded content 606 of a completed teleconference session in a recorded stage display region 608 and (ii) tabs that enable a user to switch between interactive timelines associated with the live teleconference session and the completed teleconference session. For instance, the recorded stage display region 608 includes tabs, where each tab is configured to display an interactive timeline and/or other information associated with an individual teleconference session. Accordingly, a first tab 610 is associated with the "Live Meeting" so the user can access recorded content that occurs prior to the live content 602 currently being displayed in the live meeting. A second tab 612 is associated with a "1/23/17 Meeting" (e.g., a completed teleconference session). A third tab 614 is associated with a "Shipping Meeting" (e.g., a completed teleconference session). As described above, the user can use the option to access and retrieve recordings 514 to populate the tabs. Thus, any number or recordings can be accessed and retrieved by the user (e.g., one, two, three, four, five, etc.), and any number of tabs can be configured. That is, the first tab 610 may automatically be populated with the interactive timeline 616 for the live meeting, but subsequent tabs such as the second tab 612 and the third tab 614 may be populated with interactive timelines based on user instruction (e.g., search and retrieval of recordings).

In FIG. 6A, the active tab is the first tab 610. That is, the user has selected the first tab so that the user can interact with the interactive timeline 616 of the live teleconference session. Accordingly, the interactive timeline 616 shows that the interactive timeline cursor is located at the "00:15:23" mark of a meeting that is scheduled to last thirty minutes, and the recorded content 606 concurrently displayed with the live content 602 is content that previously occurred in the live teleconference session.

In various examples, the use of the tabs in FIG. 6A may limit visual distraction associated with displaying multiple interactive timelines. Rather, the user still has access to multiple interactive timelines via the tabs, but only one interactive timeline is displayed at a given time thereby allowing the user to focus on the live content and/or the recorded content.

Figure 6B:
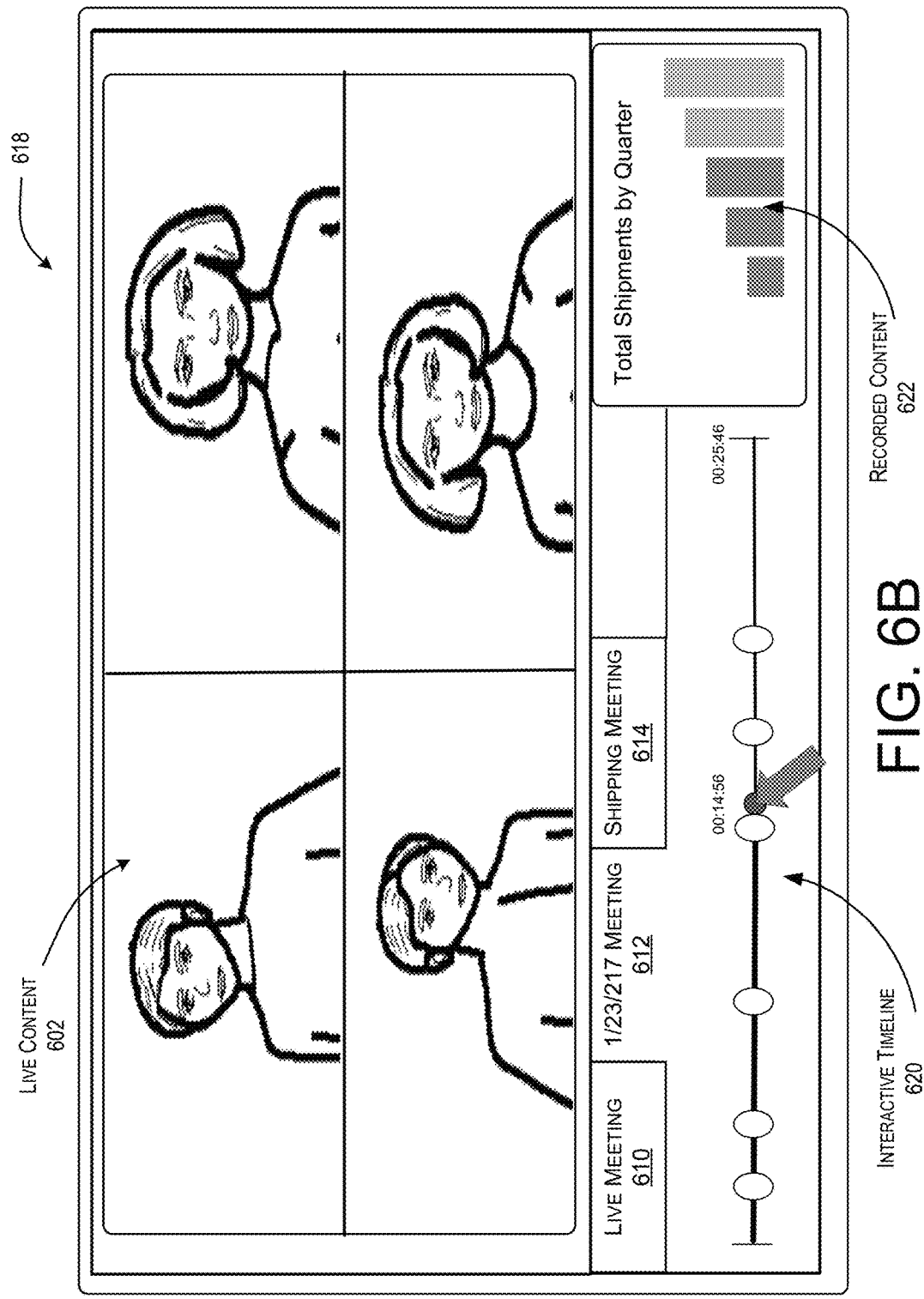
FIG. 6B illustrates an example graphical user interface configured to display (i) live content of a live teleconference session concurrently with recorded content of a completed teleconference session and (ii) tabs that enable a user to switch between interactive timelines associated with the live teleconference session and the completed teleconference session.

In the graphical user interface 618 of FIG. 6B, the active tab is the second tab 612. That is, the user has switched from the first tab 610 as shown in FIG. 6A and selected the second tab 612 so that the user can interact with the interactive timeline 620 of the "1/23/17 Meeting". Accordingly, the interactive timeline 620 shows that the interactive timeline cursor is located at the "00:14:56" mark of a completed meeting that actually lasted twenty-five minutes and forty-six seconds, and the recorded content 622 includes file content (e.g., a slide that summarizes "Total Shipments by Quarter") presented in the "1/23/17 Meeting".

In some examples, the recorded content 622 can comprise an activity sequence (e.g., a summary video) that summarizes a teleconference session (e.g., the 1/23/17 meeting). The activity sequence includes notable events that occur in the teleconference session, and thus, playback and user consumption of the activity sequence provides the user with an efficient means to gain a general awareness and understanding of what has occurred in the teleconference session without requiring the user to view and/or listen to all the recorded content of the teleconference session that the user missed.

FIG. 7A illustrates an example graphical user interface 700 configured to display an option for a user to share recorded content 702 with other participants in the live teleconference session. FIG. 7A continues the example illustrated in FIG. 6B where the user is interacting with the interactive timeline 620 of the "1/23/17 Meeting" and viewing recorded content 622. In the example of FIG. 7A, the user has located a portion (e.g., segment, video clip, etc.) of recorded content that she or he would like to share with other participants in the live teleconference session. The option to share recorded content 702 provides functionality that enables the user to share the recorded content (e.g., at the click of the button). Thus, in this example, the recorded stage display region provides a staging area for the user to locate and queue up (e.g., determine a starting position) previously recorded content that he or she would like to share with other participants.

Figure 7B:
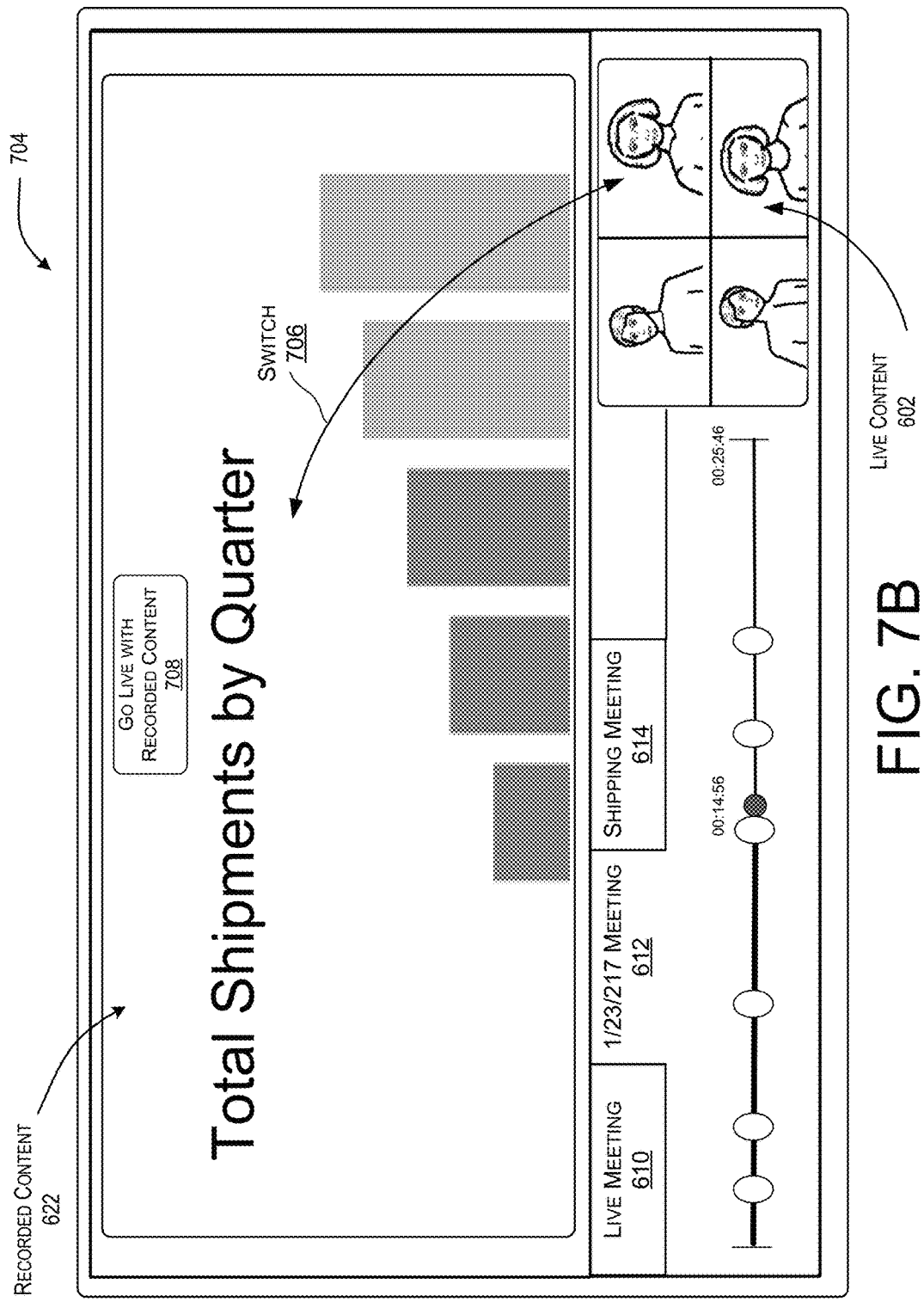
FIG. 7B illustrates an example graphical user interface configured to share recorded content with other participants in the live teleconference session based on selection of an option.

FIG. 7B illustrates an example graphical user interface 704 configured to share the recorded content with other participants in the live teleconference session based on selection of an option. Upon selection of the option to share the recorded content 702 in FIG. 7A, the live content 602 and the recorded content can be configured to switch 706 display areas. In this way, the viewer can still see the live data streams of the other participants. In this example, the user can select an option to "Go Live" with the recorded content 708. Upon selection of the option to Go Live with the recorded content 708, the previously recorded content is shared with other participants in the live teleconference session.

Figure 8A:
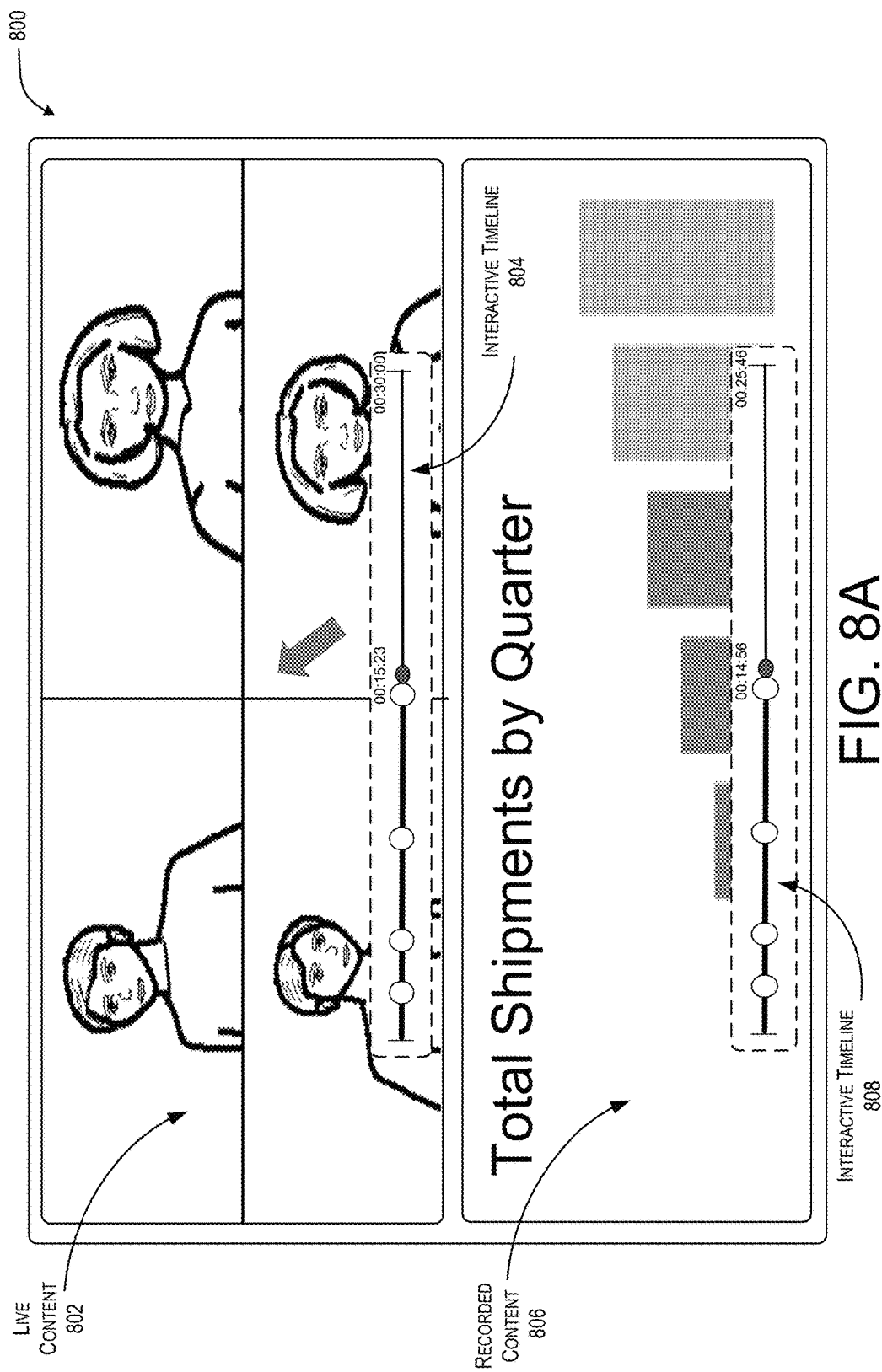
FIG. 8A illustrates an example graphical user interface configured to concurrently display live content and a corresponding interactive timeline and recorded content and a corresponding interactive timeline in multiple equally sized (e.g., scaled) display areas.

FIG. 8A illustrates an example graphical user interface 800 configured to concurrently display live content 802 and a corresponding interactive timeline 804 and recorded content 806 and a corresponding interactive timeline 808 in multiple (e.g., two) equally sized (e.g., scaled) display areas. In this example, the live content 802 includes four people collaborating with each other, and the recorded content 806 accessed by the user includes file content (e.g., a sequence of slides in a presentation being played back and the currently displayed slide explains "Total Shipments by Quarter"). The display areas in this example split the graphical user interface in a vertical direction, and thus, one display area is on top of the other.

In various examples, a user can interact (e.g., click or tap) on a display area to enable the audio for the respective content of the display area and/or to activate full engagement of a connected group modality. Consequently, audio of the other content of the other display area can be silenced (e.g., muted). In the example of FIG. 8A, the user navigates a user control element to click on the live content 802, and thus, audio of the live content 802 is enabled and the user is fully engaged in the connected group modality, while audio of the recorded content 806 is disabled.

Figure 8B:
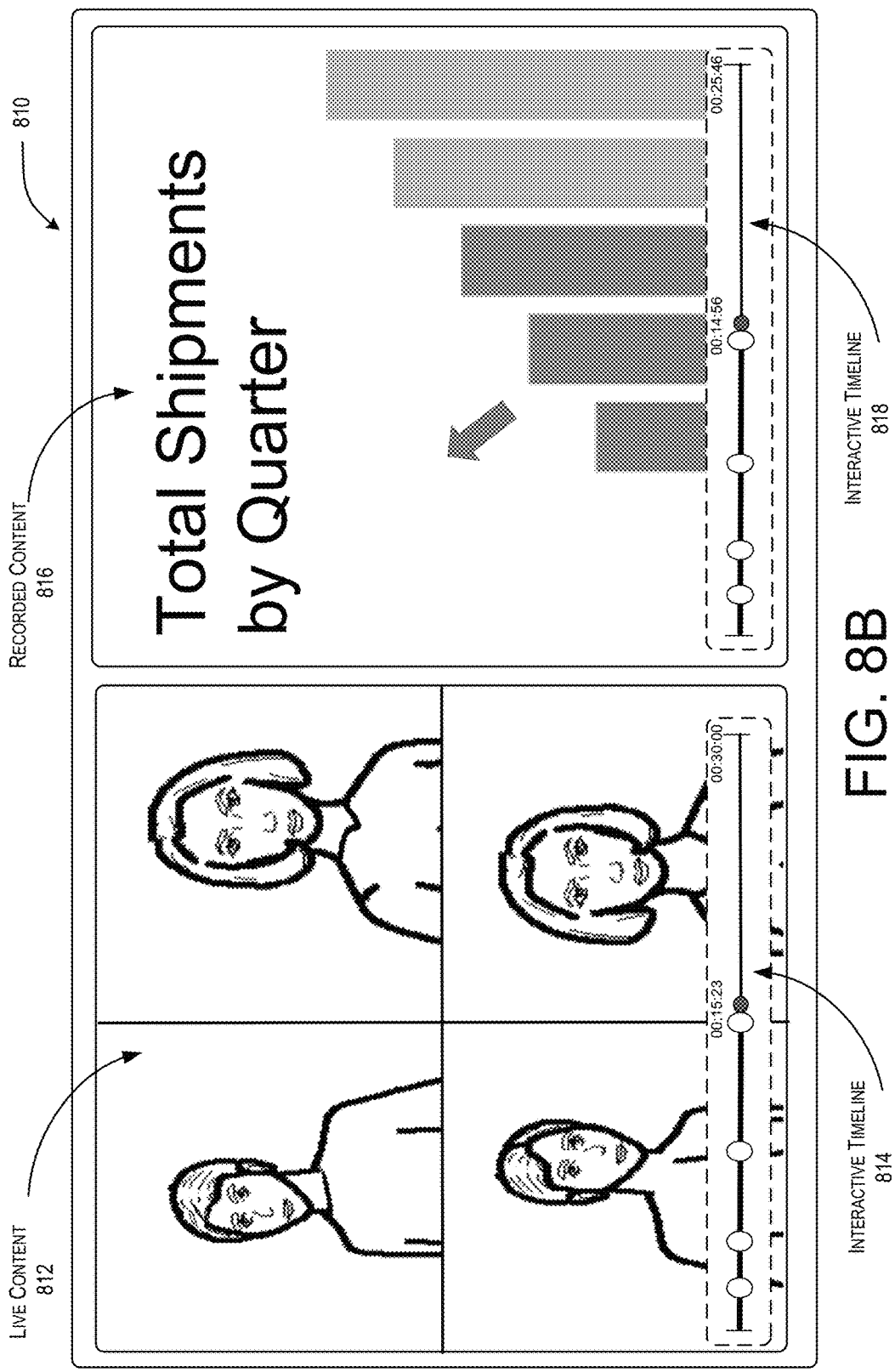
FIG. 8B illustrates another example graphical user interface configured to concurrently display live content and a corresponding interactive timeline and recorded content and a corresponding interactive timeline in multiple equally sized (e.g., scaled) display areas.

FIG. 8B illustrates another example graphical user interface 810 configured to concurrently display live content 812 and a corresponding interactive timeline 814 and recorded content 816 and a corresponding interactive timeline 818 in multiple (e.g., two) equally sized (e.g., scaled) display areas. The display areas in this example split the graphical user interface in a horizontal direction, and thus, the display areas are side by side.

In the example of FIG. 8B, the user navigates a user control element to select the recorded content 816, and thus, audio of the recorded content 818 is enabled and the user is partially engaged in the connected group modality of a live teleconference session because audio of the live content 812 is disabled.

Figure 9:
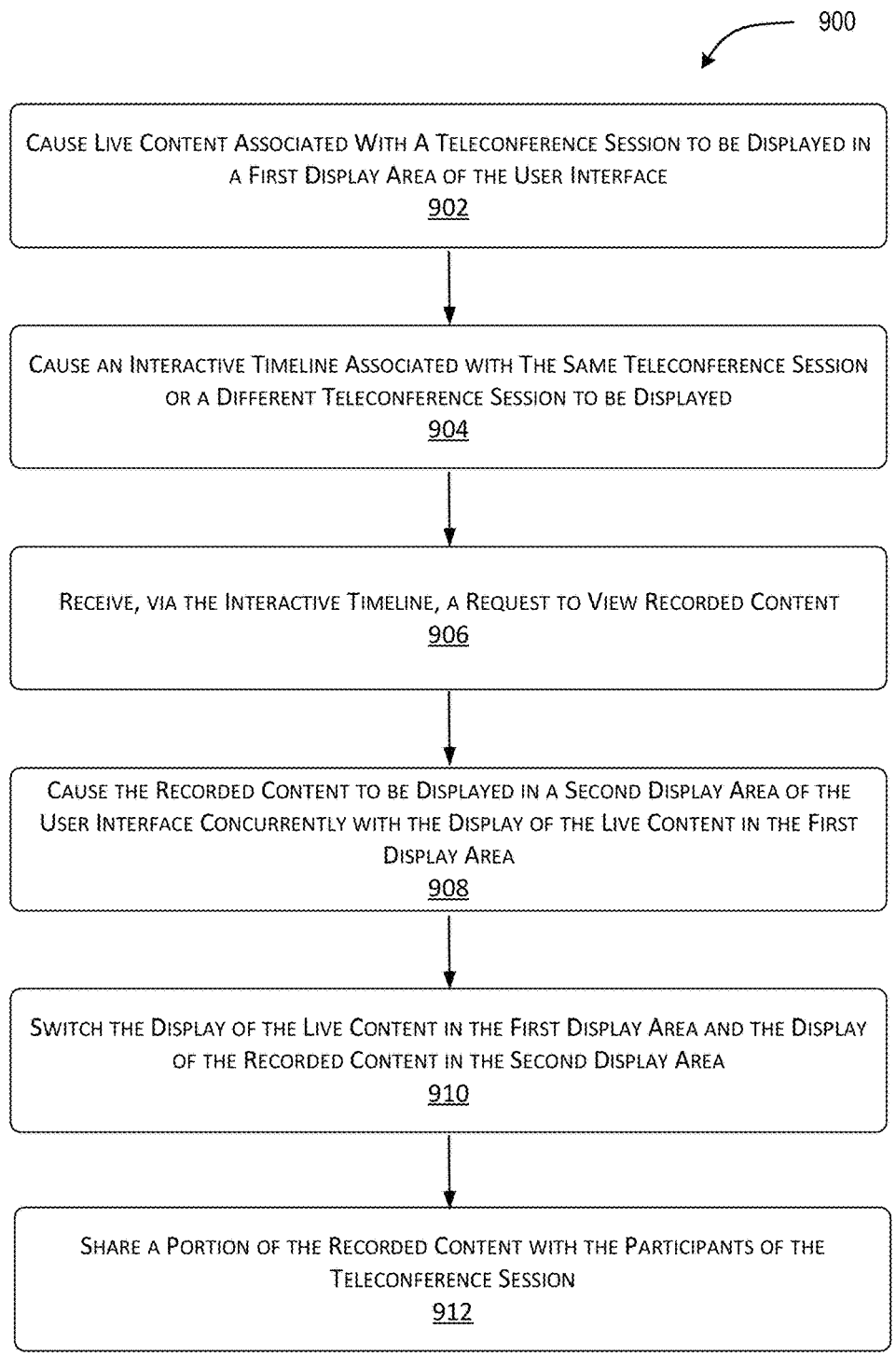
FIG. 9 is a diagram of an example flowchart that illustrates operations directed to concurrently display live content of a teleconference session and recorded content of a teleconference session.
Figure 10:
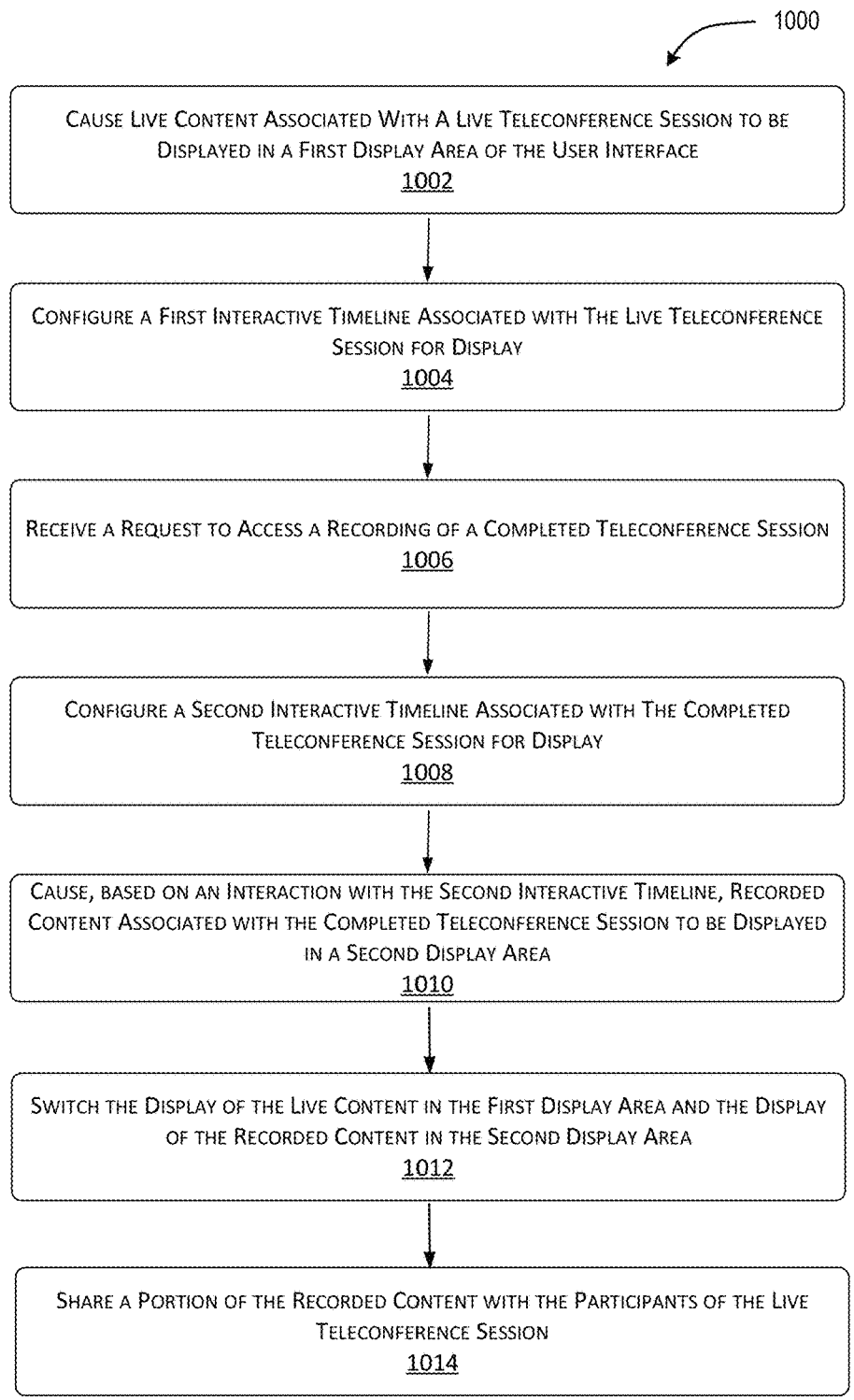
FIG. 10 is a diagram of another example flowchart that illustrates operations directed to concurrently display live content of a teleconference session and recorded content of a teleconference session.

FIGS. 9 and 10 illustrate example flowcharts. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system (e.g., device 110, client computing device 106(N), and/or device 200) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIGS. 9 and/or 10 can be implemented in association with the example graphical user interfaces described above with respect to FIGS. 3A-8B. For instance, the various device(s) and/or module(s) in FIGS. 1 and/or 2 can generate, transmit, receive, and/or display data associated with content of a teleconference session (e.g., live content, recorded content, etc.) and/or an interactive timeline that includes representations of notable events that occur in association with the teleconference session.

FIG. 9 is a diagram of an example flowchart 900 that illustrates operations directed to concurrently display live content of a teleconference session and recorded content of a teleconference session. In one example, the operations of FIG. 9 can be performed by components of the system 102 and/or a client computing device 106(N).

At operation 902, live content associated with a teleconference session is caused to be displayed in a first display area of a user interface. For example, a user of a client computing device 106(N) can join a teleconference session 104, as described above with respect to FIG. 1, and view the live content via a display screen.

At operation 904, an interactive timeline is caused to be displayed. As described above, the interactive timeline can be associated with the same teleconference session as the live content. Alternatively, the interactive timeline can be associated with a different teleconference session. That is, the user can request to access and retrieve a recording of a completed teleconference session to try to find recorded content of interest to a user.

At operation 906, a request to view recorded content is received (e.g., via the interactive timeline). For example, the user can interact with (e.g., select) a representation on the interactive timeline to identify the recorded content. In another example, the user can navigate the interactive timeline cursor to a particular position on the interactive timeline to identify the recorded content.

At operation 908, the recorded content is caused to be displayed in a second display area of the user interface concurrently with the display of the live content in the first display area of the user interface.

At operation 910, the display of the live content in the first display area and the display of the recorded content in the second display area are switched. In some examples, the switch can be implemented based on user input (e.g., selection of a switch button or a click on the recorded content). For instance, the user can navigate and scrub the interactive timeline and corresponding recorded content can be displayed in the smaller second display area as the user interacts with the interactive timeline. Upon finding recorded content of particular importance, the user can provide an input to have the recorded content toggled to the larger first display area which the live content previously occupied. In one example, the user input that switches the live and recorded content between the displays areas is associated with enabling the audio output for the recorded content.

At operation 912, a portion of the recorded content is shared with other participants of the teleconference session. For example, as shown in FIGS. 7A-7B, a user can locate, queue up, and share recorded content with the other participants.

FIG. 10 is a diagram of another example flowchart 1000 that illustrates operations directed to concurrently display live content of a teleconference session and recorded content of a teleconference session. In one example, the operations of FIG. 10 can be performed by components of the system 102 and/or a client computing device 106(N).

At operation 1002, live content associated with a live teleconference session is caused to be displayed in a first area of a user interface.

At operation 1004, a first interactive timeline associated with the live teleconference session is configured for display.

At operation 1006, a request to access a recording of a completed teleconference session is received.

At operation 1008, a second interactive timeline associated with the completed teleconference session is configured for display. For example, the first and second interactive timelines can be displayed concurrently in their respective stage display regions. In another example, the first and second interactive timelines can be configured for display in associated with tabs.

At operation 1010, the recorded content is caused to be displayed in a second display area of the user interface based on an interaction with the second recorded timeline. The display of the recorded content in the second display area can be concurrent with the display of the live content in the first display area of the user interface.

At operation 1012, the display of the live content in the first display area and the display of the recorded content in the second display area are switched.

At operation 1014, a portion of the recorded content is shared with other participants of the teleconference session.

The disclosure presented herein may be considered in view of the following example clauses.

Example Clause A, a system comprising: one or more processing units; and a computer-readable medium having encoded thereon computer-executable instructions to cause the one or more processing units to: cause live content associated with a teleconference session to be displayed in a first display area of a user interface; cause an interactive timeline to be displayed in the user interface, wherein the interactive timeline includes a plurality of representations corresponding to a plurality of notable events; receive a request to view recorded content associated with a notable event of the plurality of notable events, wherein the request is based at least in part on a selection of a representation that corresponds to the notable event; based at least in part on receiving the request, cause the recorded content to be displayed in a second display area of the user interface concurrently with the display of the live content in the first display area of the user interface; and cause the display of the live content in the first display area of the user interface and the display of the recorded content in the second display area of the user interface to be switched.

Example Clause B, the system of Example Clause A, wherein the interactive timeline is associated with the teleconference session and the recorded content comprises previous activity that occurs in the teleconference session.

Example Clause C, the system of Example Clause A, wherein the interactive timeline is associated with another teleconference session that occurred prior to the teleconference session and the recorded content captures previous activity that occurs in the other teleconference session.

Example Clause D, the system of Example Clause C, wherein the computer-executable instructions further cause the one or more processing units to: cause an option to access recordings of previous teleconference sessions to be displayed; receive, via a selection of the option, another request to access the other teleconference session; and retrieve, based at least in part on the other request, a recording of the other teleconference session so that the interactive timeline and the recorded content can be displayed.

Example Clause E, the system of any one of Example Clause A through Example Clause D, wherein the switching the display of the live content in the first display area of the user interface and the display of the recorded content in the second display area of the user interface is implemented based at least in part on user input.

Example Clause F, the system of any one of Example Clause A through Example Clause E, wherein the computer-executable instructions further cause the one or more processing units to: receive another request to enable audio for the recorded content; based at least in part on the other request, enable the audio for the recorded content while disabling audio for the live content; and cause a status indicator to be communicated and displayed to participants of the teleconference session indicating that the audio for the live content has been disabled.

Example Clause G, the system of any one of Example Clause A through Example Clause F, wherein the computer-executable instructions further cause the one or more processing units to: cause an option to share a portion of the recorded content with participants of the teleconference session to be displayed; receive, via a selection of the option, another request to share the portion of the recorded content with the participants of the teleconference session; and share, based at least in part on the other request, the portion of the recorded content with the participants of the teleconference session.

Example Clause H, the system of any one of Example Clause A through Example Clause G, wherein the first display area of the user interface is larger than the second display area of the user interface.

Example Clause I, the system of any one of Example Clause A through Example Clause G, wherein the second display area of the user interface is displayed as an overlay display area on top of the first display area of the user interface.

While the subject matter of Example Clauses A through I is described above with respect to a system, it is understood that the subject matter of Example Clauses A through I can also be implemented by a device, via computer-readable storage media, and/or as a method.

Example Clause J, a system comprising: one or more processing units; and a computer-readable medium having encoded thereon computer-executable instructions to cause the one or more processing units to: cause live content associated with a live teleconference session to be displayed in a first display area of a user interface; configure a first interactive timeline associated with the live teleconference session for display in the user interface; configure a second interactive timeline associated with a completed teleconference session for display in the user interface; and cause, based at least in part on interaction with the second interactive timeline, recorded content associated with the completed teleconference session to be displayed in a second display area of the user interface concurrently with the display of the live content associated with the live teleconference session in the first display area of the user interface.

Example Clause K, the system of Example Clause J, wherein the first interactive timeline associated with the live teleconference session and the second interactive timeline associated with the completed teleconference session are configured to be displayed concurrently.

Example Clause L, the system of Example Clause K, wherein the first display area and the second display area are of equal size and split the user interface in one of a vertical or a horizontal direction.

Example Clause M, the system of Example Clause J, wherein the first interactive timeline associated with the live teleconference session and the second interactive timeline associated with the completed teleconference session are configured to be displayed alternatively in association with a selection of a tab.

Example Clause N, the system of any one of Example Clause J through Example Clause M, wherein the computer-executable instructions further cause the one or more processing units to: cause an option to access the completed teleconference session to be displayed; receive, via a selection of the option, a request to access the completed teleconference session; and retrieve, based at least in part on the request, a recording of the completed teleconference session so that the second interactive timeline and the recorded content can be displayed.

Example Clause O, the system of any one of Example Clause J through Example Clause N, wherein the computer-executable instructions further cause the one or more processing units to: cause an option to share a portion of the recorded content with participants of the live teleconference session to be displayed; receive, via a selection of the option, a request to share the portion of the recorded content with the participants of the live teleconference session; and share, based at least in part on the request, the portion of the recorded content with the participants of the live teleconference session.

Example Clause P, the system of any one of Example Clause J through Example Clause O, wherein the computer-executable instructions further cause the one or more processing units to: receive a request to enable audio for the recorded content; based at least in part on the request, enable the audio for the recorded content while disabling audio for the live content; and cause a status indicator to be displayed to participants of the live teleconference session indicating that the audio for the live content has been disabled.

Example Clause Q, the system of any one of Example Clause J through Example Clause P, wherein the computer-executable instructions further cause the one or more processing units to cause the display of the live content in the first display area of the user interface and the display of the recorded content in the second display area of the user interface to be switched based at least in part on user input.

While the subject matter of Example Clauses J through Q is described above with respect to a system, it is understood that the subject matter of Example Clauses J through Q can also be implemented by a device, via computer-readable storage media, and/or as a method.

Example Clause R, a method comprising: causing live content associated with a live teleconference session to be displayed in a first display area of a user interface; configuring a first interactive timeline associated with the live teleconference session for display in the user interface; receiving a request to access a recording of a completed teleconference session; configuring a second interactive timeline associated with the completed teleconference session for display in the user interface; causing, based at least in part on interaction with the second interactive timeline, recorded content associated with the completed teleconference session to be displayed in a second display area of the user interface concurrently with the displaying of the live content associated with the live teleconference session in the first display area of the user interface; causing the display of the live content in the first display area to be switched with the display of the recorded content in the second display area; and sharing a portion of the recorded content with participants of the live teleconference session.

Example Clause S, the method of Example Clause R, wherein the first interactive timeline associated with the live teleconference session and the second interactive timeline associated with the completed teleconference session are configured to be displayed concurrently.

Example Clause T, the method of Example Clause R, wherein the first interactive timeline associated with the live teleconference session and the second interactive timeline associated with the completed teleconference session are configured to be displayed alternatively in association with a selection of a tab.

While the subject matter of Example Clauses R through T is described above with respect to a method, it is understood that the subject matter of Example Clauses R through T can also be implemented by a device, by a system, and/or via computer-readable storage media.

Although the techniques have been described in language specific to structural features and/or methodological acts, it is to be understood that the appended claims are not necessarily limited to the features or acts described. Rather, the features and acts are described as example implementations of such techniques.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processing units; and
   a computer-readable medium having encoded thereon computer-executable instructions to cause the one or more processing units to:
   cause live content associated with a communication session to be displayed in a first display area of a user interface;
   cause additional content to be displayed in a second display area of the user interface concurrently with the display of the live content in the first display area of the user interface;
   receive a request to enable audio for the additional content;
   based at least in part on receiving the request:
      enable the audio for the additional content on a device associated with a participant of the communication session; and
      disable audio for the live content on the device associated with the participant of the communication session; and
   cause a status to be displayed to other participants of the communication session, the status indicating that the participant is partially engaged in the communication session based at least in part on (i) the audio for the live content having been disabled on the device associated with the participant of the communication session and (ii) the live content associated with the communication session continuing to be displayed in the first display area of the user interface.

2. The system of claim 1, wherein the additional content comprises recorded content that captures activity that previously occurs in the communication session.

3. The system of claim 1, wherein the additional content comprises recorded content of another communication session that occurred prior to the communication session and the recorded content captures activity that occurs in the other communication session.

4. The system of claim 3, wherein the computer-executable instructions further cause the one or more processing units to:
cause an option to access recordings of previous communication sessions to be displayed;
receive, via a selection of the option, another request to access the other communication session; and
retrieve, based at least in part on receiving the other request, a recording of the other communication session so that the recorded content can be displayed.

5. The system of claim 1, wherein the computer-executable instructions further cause the one or more processing units to cause the display of the live content in the first display area of the user interface to be switched with the display of the additional content in the second display area of the user interface.

6. The system of claim 1, wherein the computer-executable instructions further cause the one or more processing units to:
cause an option to share a portion of the additional content with the other participants of the communication session to be displayed;
receive, via a selection of the option, another request to share the portion of the additional content with the other participants of the communication session; and
share, based at least in part on receiving the other request, the portion of the additional content with the other participants of the communication session.

7. The system of claim 1, wherein the first display area of the user interface is larger than the second display area of the user interface.

8. The system of claim 1, wherein the second display area of the user interface is displayed as an overlay display area on top of the first display area of the user interface.

9. The system of claim 1, wherein the request to enable the audio for the additional content is received based at least in part on a user interaction with the second display area of the user interface.

10. The system of claim 1, wherein the computer-executable instructions further cause the one or more processing units to cause a live video feed of the participant to be replaced with a user avatar based at least in part on disabling the audio for the live content on the device associated with the participant of the communication session.

11. A system comprising:
one or more processing units; and
a computer-readable medium having encoded thereon computer-executable instructions to cause the one or more processing units to:
cause live content associated with a communication session to be displayed in a first display area of a user interface;
cause additional content to be displayed in a second display area of the user interface concurrently with the display of the live content in the first display area of the user interface;
receive an indication that audio for the additional content has been enabled on a device associated with a participant of the communication session and that audio for the live content has been disabled on the device associated with the participant of the communication session; and
cause, based at least in part on receiving the indication, a notification to be displayed to other participants of the communication session, the notification indicating that the participant is partially engaged in the communication session based at least in part on (i) the audio for the live content having been disabled on the device associated with the participant of the communication session and (ii) the live content associated with the communication session continuing to be displayed in the first display area of the user interface.

12. The system of claim 11, wherein the additional content comprises recorded content that captures activity that previously occurs in the communication session.

13. The system of claim 11, wherein the additional content comprises recorded content of another communication session that occurred prior to the communication session and the recorded content captures activity that occurs in the other communication session.

14. The system of claim 13, wherein the computer-executable instructions further cause the one or more processing units to:
cause an option to access recordings of previous communication sessions to be displayed;
receive, via a selection of the option, a request to access the other communication session; and
retrieve, based at least in part on receiving the request, a recording of the other communication session so that the recorded content can be displayed.

15. The system of claim 11, wherein the computer-executable instructions further cause the one or more processing units to cause the display of the live content in the first display area of the user interface to be switched with the display of the additional content in the second display area of the user interface.

16. The system of claim 11, wherein the indication is received based at least in part on a user interaction with the second display area of the user interface.

17. The system of claim 11, wherein the computer-executable instructions further cause the one or more processing units to cause a live video feed of the participant to be replaced with a user avatar based at least in part on the audio for the live content being disabled on the device associated with the participant of the communication session.

18. A method comprising:
causing, by one or more processing units, live content associated with a communication session to be displayed in a first display area of a user interface;
causing additional content to be displayed in a second display area of the user interface concurrently with the display of the live content in the first display area of the user interface;
receiving an indication that audio for the additional content has been enabled on a device associated with a participant of the communication session and that audio for the live content has been disabled on the device associated with the participant of the communication session; and causing, based at least in part on receiving the indication, a notification to be displayed to other participants of the communication session, the notification indicating that the participant is partially engaged in the communication session based at least in part on (i) the audio for the live content having been disabled on the device associated with the participant of the communication session and (ii) the live content associated with the communication session continuing to be displayed in the first display area of the user interface.

19. The method of claim 18, wherein the indication is received based at least in part on a user interaction with the second display area of the user interface.

20. The method of claim 18, further comprising causing a live video feed of the participant to be replaced with a user avatar based at least in part on the audio for the live content being disabled on the device associated with the participant of the communication session.

* * * * *